United States Patent
Tripathi et al.

(10) Patent No.: US 12,461,198 B2
(45) Date of Patent: Nov. 4, 2025

(54) RADAR MONOLITHIC MICROWAVE INTEGRATED CIRCUIT (MMIC) WITH CONTEXT-BASED PROGRAMMING

(71) Applicant: Infineon Technologies AG, Neubiberg (DE)

(72) Inventors: Pranava Tripathi, Linz (AT); Alexander Daum, Hallein (AT)

(73) Assignee: Infineon Technologies AG, Neubiberg (DE)

( * ) Notice: Subject to any disclaimer, the term of this patent is extended or adjusted under 35 U.S.C. 154(b) by 324 days.

(21) Appl. No.: 18/342,374

(22) Filed: Jun. 27, 2023

(65) Prior Publication Data

US 2025/0004101 A1  Jan. 2, 2025

(51) Int. Cl.
*G01S 7/40* (2006.01)
*G01S 13/931* (2020.01)

(52) U.S. Cl.
CPC .............. *G01S 7/40* (2013.01); *G01S 13/931* (2013.01); *G01S 2013/9316* (2020.01)

(58) Field of Classification Search
CPC .. G01S 7/40; G01S 13/931; G01S 2013/9316; G01S 13/343; G01S 7/03; G01S 7/003; G01S 2013/9315; G01S 2013/9321; G01S 7/032
See application file for complete search history.

(56) References Cited

U.S. PATENT DOCUMENTS

| | | | | |
|---|---|---|---|---|
| 5,412,414 A | * | 5/1995 | Ast | G01S 7/4017 |
| | | | | 342/372 |
| 2019/0041494 A1 | * | 2/2019 | Roger | G01S 7/003 |
| 2019/0250247 A1 | * | 8/2019 | Schmid | G01S 13/825 |
| 2021/0003661 A1 | * | 1/2021 | Xu | G01S 13/931 |
| 2021/0364598 A1 | * | 11/2021 | Tripathi | G01S 7/4017 |

* cited by examiner

*Primary Examiner* — Vladimir Magloire
*Assistant Examiner* — Yonghong Li
(74) *Attorney, Agent, or Firm* — Harrity & Harrity, LLP

(57) ABSTRACT

A method of configuring a radar monolithic microwave integrated circuit (MMIC) and executing commands of an activated downloadable programming context is provided. The method includes receiving and storing a plurality of downloadable programming contexts that are sequentially received from an external controller, where each subsequent downloadable programming context received from the external controller is stored in a different random-access memory (RAM) partition of the radar MMIC than a RAM partition of the radar MMIC used to store a most-recent downloadable programming context received from the external controller; sequentially activating and deactivating the plurality of downloadable programming contexts according to a context execution sequence; executing the commands of an activated downloadable programming context stored in a corresponding RAM partition; and downloading a next downloadable programming context prior to a time slot in the context execution sequence that is assigned to the next downloadable programming context.

23 Claims, 9 Drawing Sheets

500 ⟶

# RADAR MONOLITHIC MICROWAVE INTEGRATED CIRCUIT (MMIC) WITH CONTEXT-BASED PROGRAMMING

BACKGROUND

Radar sensors are used in a number of applications to detect objects, where the detection typically comprises measuring distances, velocities, or angles of arrival associated with detected targets. In particular, in the automotive sector, there is an increasing need for radar sensors that are able to be used in, for example, driving assistance systems (e.g., advanced driver assistance systems (ADAS)), such as, for example, in adaptive cruise control (ACC) or radar cruise control systems. Such systems are able to automatically adjust a speed of a motor vehicle in order to maintain a safe distance from other motor vehicles traveling in front of the motor vehicle (and from other objects and pedestrians). Other example applications of a radar sensor in the automotive sector include blind spot detection, lane change assist, and the like.

SUMMARY

In some implementations, a radar monolithic microwave integrated circuit (MMIC) includes at least one of a transmit channel for transmitting radar signals or a receive channel for receiving reflected radar signals; a communication interface configured to sequentially receive a plurality of downloadable programming contexts from an external controller, wherein each downloadable programming context comprises a respective program and associated data; a random-access memory (RAM) comprising a plurality of partitions configured to sequentially store the plurality of downloadable programming contexts that are received from the external controller, wherein each subsequent downloadable programming context received from the external controller is stored in a different partition than a partition used to store a most-recent downloadable programming context received from the external controller; and a configuration and sequencing circuit configured to: sequentially activate and deactivate the plurality of downloadable programming contexts according to a context execution sequence, and execute an activated downloadable programming context stored in a corresponding partition of the plurality of partitions, wherein the communication interface is configured to receive, and the RAM is configured to store, a subsequent downloadable programming context prior to a time slot in the context execution sequence that is assigned to the subsequent downloadable programming context.

In some implementations, a method of configuring a radar MMIC and executing commands of an activated downloadable programming context includes receiving and storing a plurality of downloadable programming contexts that are sequentially received from an external controller, wherein each downloadable programming context comprises a respective program and associated data, wherein each subsequent downloadable programming context received from the external controller is stored in a different RAM partition of the radar MMIC than a RAM partition of the radar MMIC used to store a most-recent downloadable programming context received from the external controller; sequentially activating and deactivating the plurality of downloadable programming contexts according to a context execution sequence; executing the commands of an activated downloadable programming context stored in a corresponding RAM partition; and downloading a next downloadable programming context prior to a time slot in the context execution sequence that is assigned to the next downloadable programming context.

BRIEF DESCRIPTION OF THE DRAWINGS

Implementations are described herein making reference to the appended drawings.

DETAILED DESCRIPTION

Figure 1:
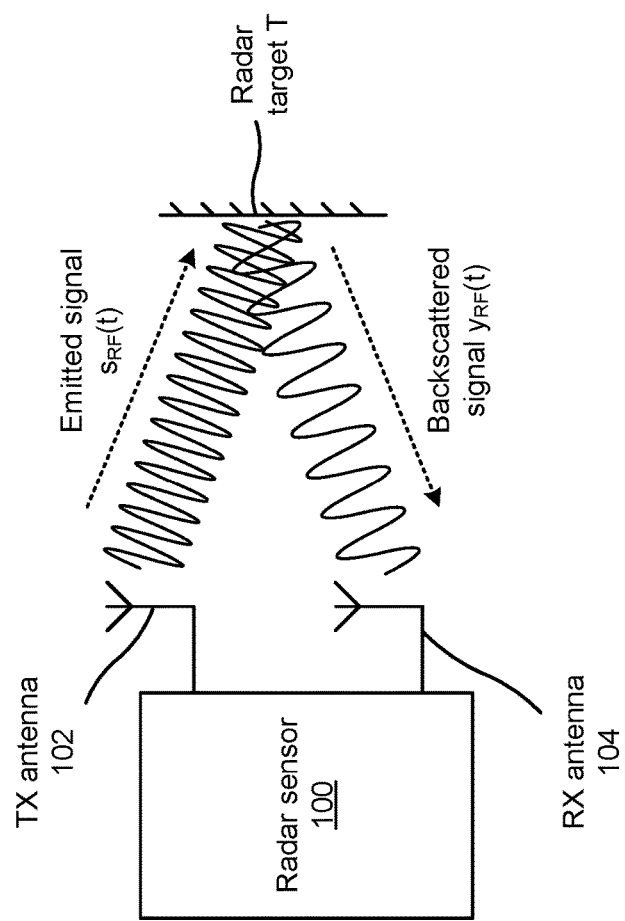
FIG. 1 is a diagram of an example application of a frequency-modulated continuous-wave (FMCW) radar sensor.

In the following, details are set forth to provide a more thorough explanation of example implementations. However, it will be apparent to those skilled in the art that these implementations may be practiced without these specific details. In other instances, well-known structures and devices are shown in block diagram form or in a schematic view rather than in detail in order to avoid obscuring the implementations. In addition, features of the different implementations described hereinafter may be combined with each other, unless specifically noted otherwise.

Further, equivalent or like elements or elements with equivalent or like functionality are denoted in the following description with equivalent or like reference numerals. As the same or functionally equivalent elements are given the same reference numbers in the figures, a repeated description for elements provided with the same reference numbers may be omitted. Hence, descriptions provided for elements having the same or like reference numbers are mutually exchangeable.

Each of the illustrated x-axis, y-axis, and z-axis is substantially perpendicular to the other two axes. In other words, the x-axis is substantially perpendicular to the y-axis and the z-axis, the y-axis is substantially perpendicular to the x-axis and the z-axis, and the z-axis is substantially perpendicular to the x-axis and the y-axis. In some cases, a single reference number is shown to refer to a surface, or fewer than all instances of a part may be labeled with all surfaces of that part. All instances of the part may include associated surfaces of that part despite not every surface being labeled.

The orientations of the various elements in the figures are shown as examples, and the illustrated examples may be rotated relative to the depicted orientations. The descriptions provided herein, and the claims that follow, pertain to any structures that have the described relationships between various features, regardless of whether the structures are in the particular orientation of the drawings, or are rotated relative to such orientation. Similarly, spatially relative terms, such as "top," "bottom," "below," "beneath," "lower," "above," "upper," "middle," "left," and "right," are used herein for ease of description to describe one element's relationship to one or more other elements as illustrated in the figures. The spatially relative terms are intended to encompass different orientations of the element, structure, and/or assembly in use or operation in addition to the orientations depicted in the figures. A structure and/or assembly may be otherwise oriented (rotated 90 degrees or at other orientations), and the spatially relative descriptors used herein may be interpreted accordingly. Furthermore, the cross-sectional views in the figures only show features within the planes of the cross-sections, and do not show materials behind the planes of the cross-sections, unless indicated otherwise, in order to simplify the drawings.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

In implementations described herein or shown in the drawings, any direct electrical connection or coupling, e.g., any connection or coupling without additional intervening elements, may also be implemented by an indirect connection or coupling, e.g., a connection or coupling with one or more additional intervening elements, or vice versa, as long as the general purpose of the connection or coupling, for example, to transmit a certain kind of signal or to transmit a certain kind of information, is essentially maintained. Features from different implementations may be combined to form further implementations. For example, variations or modifications described with respect to one of the implementations may also be applicable to other implementations unless noted to the contrary.

As used herein, the terms "substantially" and "approximately" mean "within reasonable tolerances of manufacturing and measurement." For example, the terms "substantially" and "approximately" may be used herein to account for small manufacturing tolerances or other factors (e.g., within 5%) that are deemed acceptable in the industry without departing from the aspects of the implementations described herein. For example, a resistor with an approximate resistance value may practically have a resistance within 5% of the approximate resistance value. As another example, an approximate signal value may practically have a signal value within 5% of the approximate signal value.

In the present disclosure, expressions including ordinal numbers, such as "first", "second", and/or the like, may modify various elements. However, such elements are not limited by the above expressions. For example, the above expressions do not limit the sequence and/or importance of the elements. The above expressions are used merely for the purpose of distinguishing an element from the other elements. For example, a first box and a second box indicate different boxes, although both are boxes. For further example, a first element could be termed a second element, and similarly, a second element could also be termed a first element without departing from the scope of the present disclosure.

A radar MMIC, sometimes referred to as single radar chip, may incorporate all core functions of a radio frequency (RF) frontend of a radar transceiver (e.g., local oscillator, power amplifiers, low-noise amplifiers (LNAs), mixers, etc.), analog preprocessing of the intermediate frequency (IF) or baseband signals (e.g., filters, amplifiers, etc.), and analog-to-digital conversion in one single package. The RF frontend usually includes multiple reception (RX) and transmission (TX) channels, particularly in applications in which beam steering techniques, phased antenna arrays, etc., are used. In radar applications, phased antenna arrays may be employed to sense an incidence angle of incoming RF radar signals (also referred to as "direction of arrival" or DOA).

A microcontroller acts as a supervisor for a radar MMIC by sending commands and receiving responses over one or more communication channels (e.g., a bus system, such as a serial peripheral interface (SPI)). As a result, the radar MMIC is controlled by the microcontroller. The microcontroller may be a different chip or may be integrated into the same chip as the radar. When the microcontroller is integrated into the same chip as the radar MMIC, the microcontroller may be connected to the radar MMIC with a fast data bus (e.g., an advanced high-performance bus (AHB) or an advanced extensible interface (AXI)) and memory of the radar MMIC may be directly accessible to the microcontroller.

The radar MMIC contains one or more central processing units (CPUs) to execute firmware (FW) for carrying out various radar MMIC operations, such as receiving, processing, and responding to the commands from the microcontroller, startup routines, initializing configurations and settings, error handling, calibrating various radar MMIC hardware blocks, and monitoring one or more radar MMIC operations. The firmware may be embedded in non-volatile memory (e.g., read-only memory (ROM) or flash memory) of the radar MMIC, downloaded from the microcontroller into volatile memory (e.g., RAM) of the radar MMIC, or a combination of both.

However, firmware size is increasing as radar MMICs become more sophisticated. As a result, there is increasing need of larger on-chip memory in order to store the firmware. Larger on-chip memory typically makes the radar MMIC more expensive to manufacture and increases a size of the radar MMIC, both of which can increase system costs. Moreover, firmware stored in the ROM of the radar MMIC cannot be changed after the radar MMIC is manufactured, which can limit the radar MMIC to performing only those radar MMIC operations and settings configured in the ROM. In addition, executing larger firmware in RAM may require increased MMIC startup time, because a larger size of firmware needs to be transferred from an external device, such as a microcontroller, to the radar MMIC prior to execution of the firmware.

Some implementations disclosed herein are directed to a radar MMIC using a plurality of programming contexts (e.g., programming bundles of MMIC firmware and a set of application-specific data) for execution by the radar MMIC. The microcontroller may be configured to upload a programming context to the radar MMIC (e.g., the radar MMIC may be configured to download the programming context from the microcontroller) to execute a part of microcontroller application. The microcontroller may be configured to sequentially upload multiple programming contexts to the radar MMIC to be executed by the radar MMIC. The radar MMIC may be configured to remove or overwrite a programming context when the programming context is no longer needed (e.g., after the programming context has been executed) to make memory space available for additional programming contexts. Thus, the microcontroller application may be broken up into a plurality of downloadable programming contexts that are sequentially provided from the microcontroller to the radar MMIC and overwritten at the radar MMIC as the execution of a downloadable programming context is completed. For example, the radar MMIC may include two or more RAM partitions in its volatile memory to store the different downloadable programming contexts on a one-by-one basis. The RAM partitions may ensure that there is no interference with an active programming context that is being executed and inactive programming contexts that are not being executed when the microcontroller transfers another programming context to the radar MMIC. Moreover, a RAM partition (e.g., an inactive RAM partition) may be used for downloading a downloadable programming context while another RAM partition (e.g., an active RAM partition) is being used to execute an active programming context.

As a result, commands that are only needed in a specific part of the microcontroller application are only loaded in volatile memory when they are required, which may reduce a size of firmware stored at the radar MMIC at any given moment. A programming context may be built and validated before execution, which may reduce runtime overhead for checking validity of each configured command. New or updated commands can be included in a downloadable programming context, making the radar MMIC more flexible as compared to a radar MMIC that only uses ROM-based firmware. Only a small part of the firmware is transferred to the RAM of the radar MMIC at a time, which may reduce both memory size of the radar MMIC and MMIC startup time.

FIG. 1 is a diagram illustrating an example application of an FMCW radar sensor in the form of a radar sensor 100 for measuring distances, velocities, or angle of arrivals (AoAs) associated with objects, referred to as targets. As shown in FIG. 1, the radar sensor 100 may have one or more TX antennas 102 and one or more RX antennas 104. In some implementations, a single antenna may be used that serves simultaneously as a TX antenna 102 and as an RX antenna 104.

In operation, the TX antenna 102 continuously emits an RF signal $S_{RF}(t)$ (also referred to as a transmitted radar signal), which is frequency-modulated, for example, by a periodic linear frequency ramp signal (also referred to as a frequency sweep or chirp signal). The transmitted radar signal $S_{RF}(t)$ is backscattered at a target T and a reflected signal $y_{RF}(t)$ (e.g., a back-scattered signal, an echo signal, a received RF signal, or a received radar signal) is received by the RX antenna 104. FIG. 1 shows a simplified example—in practice, the radar sensor 100 may include a plurality of TX antennas 102 and RX antennas 104 to be able to determine an AoA of the received RF signal $y_{RF}(t)$ and, therefore, locate the target T with increased accuracy as compared to a radar sensor that may use a single TX antenna and/or a signal RX antenna.

It will be appreciated that "(t)" denotes an analog signal defined as a continuous-time signal that may change over a time period t, and "[n]" denotes a digital signal defined as a discrete-time signal, where n is an integer and may represent an nth sample or a signal containing n samples. A signal may be represented with or without its continuous-time or discrete-time domain identifier (t) and [n], respectively. It will be further appreciated that RF circuits, such as the radar sensor 100, may be used in fields other than radar. For example, RF circuits may be used in RF communication systems. Accordingly, in some implementations, the radar sensor 100 may be used in RF applications other than radar, such as RF communications.

As indicated above, FIG. 1 is provided as an example. Other examples may differ from what is described with regard to FIG. 1.

Figure 2:
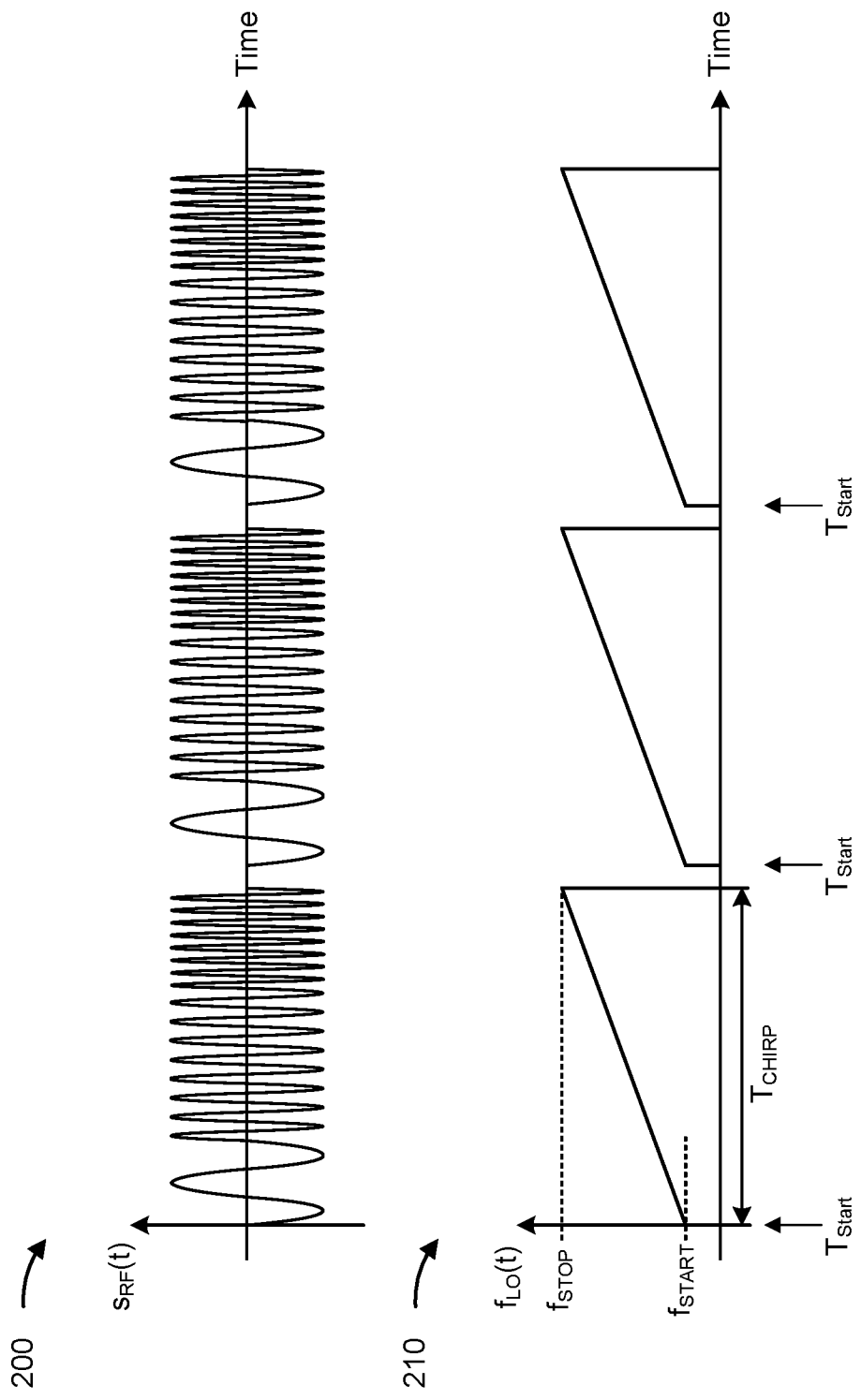
FIG. 2 illustrates an example of frequency modulation of a transmitted radar signal transmitted by the FMCW radar sensor.

FIG. 2 illustrates an example of the frequency modulation of the RF signal $S_{RF}(t)$. As illustrated in the upper diagram 200 of FIG. 2, the RF signal $S_{RF}(t)$ comprises a plurality of frequency ramps or a series of "chirps"; that is to say, the RF signal $S_{RF}(t)$ comprises a sequence of sinusoidal signal profiles (e.g., waveforms) with a rising frequency (referred to as an up-chirp) or a falling frequency (referred to as a down-chirp). In the example shown in FIG. 2, the instantaneous frequency $f_{LO}(t)$ of a chirp increases linearly, from a start frequency $f_{START}$ to a stop frequency $f_{STOP}$ within a time interval $T_{CHIRP}$, as shown in the lower diagram 210 of FIG. 2. Such chirps are also referred to as linear frequency ramps. For a measurement, a sequence of frequency ramps is emitted, and a resulting echo signal is evaluated in baseband to detect one or more radar targets.

A frequency-modulated ramp signal, such as a local oscillator signal used for generating a radar signal, may include a plurality of radar frames, which may also be referred to as radar operation cycles or chirp frames. A sequence of ramps may make up each radar frame. For example, a radar operation cycle may include several hundreds of radar ramps (sweeps) taking up to 10-30 milliseconds (ms) in total. A frame length of the radar frame may correspond to one radar operation cycle. Consecutive ramps may have a short pause therebetween, and a longer pause may be used between consecutive radar frames. The longer pause between consecutive radar frames may be referred to as a configuration interval, during which one or more ramp parameters of the RF signal $S_{RF}(t)$ can be adjusted for subsequent radar frames. A ramp start time $T_{START}$ indicates a start time for each chirp and may occur at a predetermined interval according to, for example, a number of clock cycles.

The start frequency $f_{START}$ and stop frequency $f_{STOP}$ of the ramps may be within a frequency band with minimum frequency Fmin and maximum frequency Fmax. As a result, the minimum frequency Fmin and the maximum frequency Fmax define an operating frequency range or a frequency band usable for the ramping signals, and thus the frequency range or the frequency band of the radar application of a radar MMIC. In some implementations, the frequency range defined by a single ramp having start and stop frequencies $f_{START}$ and $f_{STOP}$ may be smaller than the usable radar frequency band. However, all ramps that are generated during operation may lie between the frequencies Fmin and Fmax of the radar frequency band (e.g., between 76-81 GHz) used for generating the ramping signals.

FIG. 2 illustrates three identical linear frequency ramps or chirps. However, the parameters $f_{START}$, $f_{STOP}$, $T_{CHIRP}$, and/or the pause between the individual frequency ramps may vary depending on the actual implementation and/or use of the radar sensor 100. In practice, the frequency variation may be, for example, linear (linear ramp, frequency ramp), exponential (exponential ramp), or hyperbolic (hyperbolic ramp). In some implementations, the frequency may decrease instead of increase during time interval $T_{CHIRP}$. Furthermore, in some implementations, a center frequency of each ramp (and therefore $f_{START}$ and $f_{STOP}$) may vary (e.g., from ramp to ramp or after detecting an interference) to allow using the full or a part of the frequency band. In one example, the frequency band has a minimum frequency Fmin of 76 gigahertz (GHz) and a maximum frequency Fmax of 81 GHz.

Thus, while three identical linear frequency ramps or chirps with the same start frequency $f_{START}$ and stop frequency $f_{STOP}$ are illustrated in FIG. 2, the start frequency $f_{START}$ and stop frequency $f_{STOP}$ may vary within a radar frame or across multiple radar frames. A local oscillator signal $S_{LO}(t)$ may be used to generate the RF signal $S_{RF}(t)$. Thus, it can be said that the local oscillator signal $S_{LO}(t)$ and the RF signal $S_{RF}(t)$ are frequency-modulated ramp signals that are generated within an operating frequency range (e.g., a predefined radar frequency range). For example, the local oscillator signal $S_{LO}(t)$ may be a frequency-modulated ramp signal that includes a plurality of frequency ramps, each starting at a respective ramp start frequency and ending at a respective ramp stop frequency, and the respective ramp start frequencies and the respective ramp stop frequencies of the plurality of frequency ramps define a frequency range within the bounds of the operating frequency range. The frequency range of the plurality of frequency ramps may be defined by the lowest start frequency $f_{START}$ and the highest stop frequency $f_{STOP}$ among the frequency ramps in a given time interval (e.g., in an implementation in which the frequency increases within each frequency ramp). As noted above, the start frequency $f_{START}$ and the stop frequency $f_{STOP}$ of a sequence of frequency ramps may be the same, and thus the center frequency of each ramp may be constant. Alternatively, the center frequency of each ramp (and therefore $f_{START}$ and $f_{STOP}$) may vary from ramp to ramp or after detecting an interference. The bandwidth (e.g., frequency range) of each ramp may also vary from ramp to ramp or after detecting an interference.

As indicated above, FIG. 2 is provided as an example. Other examples may differ from what is described with regard to FIG. 2.

Figure 3:
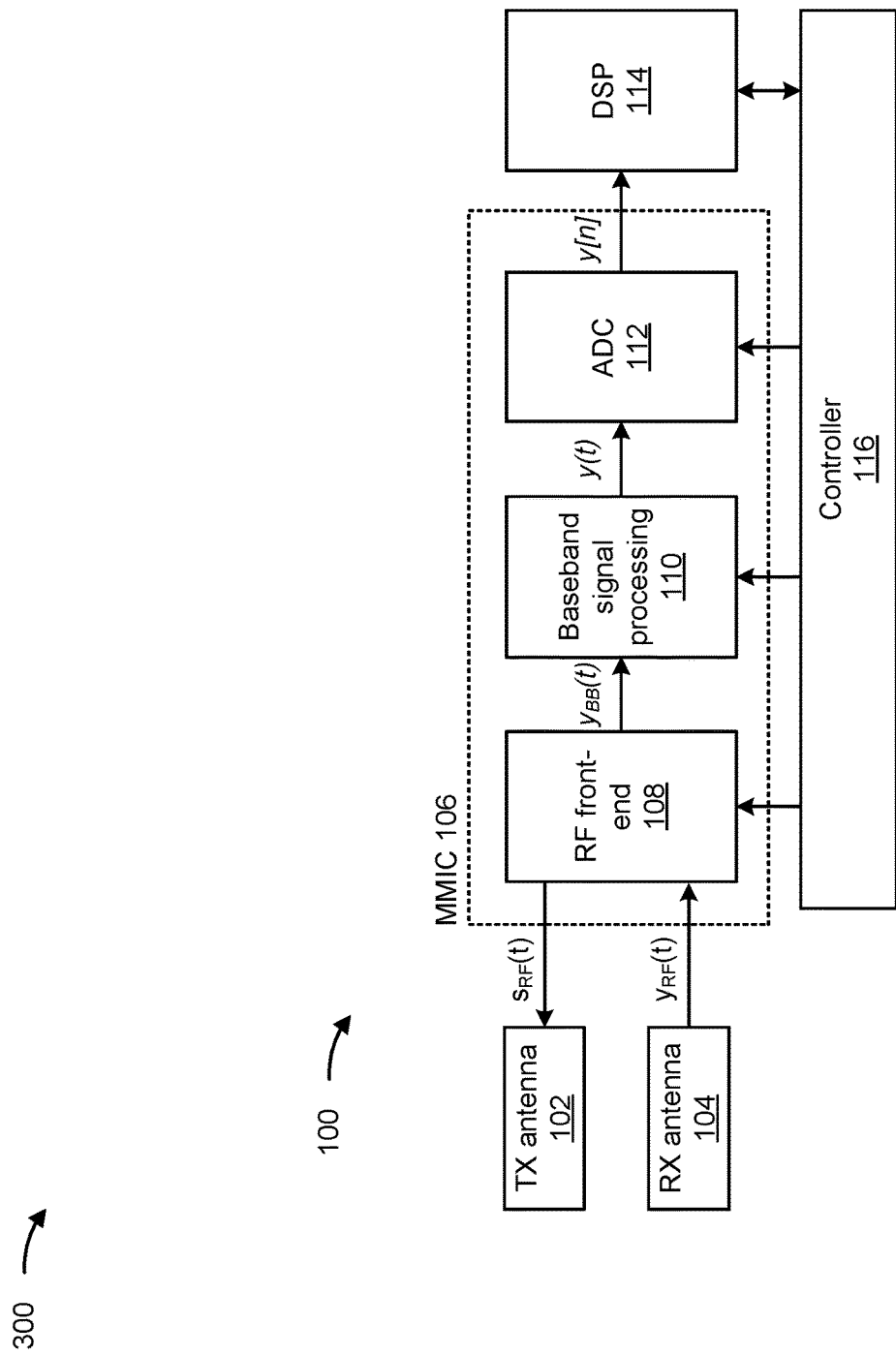
FIG. 3 is a block diagram that illustrates an example structure of the FMCW radar sensor.

FIG. 3 is a block diagram that illustrates an example structure of the radar sensor 100. As shown, the radar sensor 100 may include one or more TX antennas 102, one or more RX antennas 104, a radar MMIC 106 (comprising an RF front-end 108, a baseband signal processing circuit 110, and an analog-to-digital converter (ADC) 112), a digital signal processor (DSP) 114, and a controller 116. In some implementations, the MMIC may include a digital front-end (DFE) coupled downstream from the ADC 112. The digital front-end may include circuit components associated with performing signal processing on a digital signal generated by the ADC 112 (e.g., digital filtering). In some cases, the DFE may include the DSP 114.

In the radar sensor 100, the one or more TX antennas 102 and the one or more RX antennas 104 are connected to the RF front-end 108. The RF front-end 108 may include circuit components associated with performing RF signal processing. These circuit components may include, for example, a local oscillator (LO), one or more RF power amplifiers, one or more LNAs, one or more directional couplers (e.g., rat-race couplers, circulators, or the like), or one or more mixers for downmixing (e.g., down-converting or demodulating) RF signals into baseband or an intermediate frequency band (IF band). The RF front-end 108 may be integrated into the radar MMIC 106 with one or more other components, as shown in FIG. 3. The IF band is sometimes also referred to as baseband. Accordingly, "baseband" and "IF band" may be used interchangeably herein. Baseband signals are those signals on the basis of which radar targets are detected.

Antenna arrays may be used instead of single antennas. The depicted example shows a bistatic (or pseudo-monostatic) radar system, which has separate RX and TX antennas. In the case of a monostatic radar system, a single antenna or a single antenna array may be used to both receive and transmit electromagnetic (radar) signals. In this case, a directional coupler (e.g., a circulator) may be used to separate RF signals to be transmitted to the radar channel from RF signals received from the radar channel. In practice, radar systems often include several TX and RX channels, which allows for measurement of the direction (e.g., direction of arrival) from which the radar echoes are received.

In some implementations, the radar sensor 100 may include a plurality of TX antennas 102 and a plurality of RX antennas 104, which enables the radar sensor 100 to measure an AoA from which radar echoes are received. In the case of such systems, individual TX channels and RX channels may be constructed identically or similarly and may be distributed over one or more radar MMICs 106.

In some implementations, a signal emitted by the TX antenna 102 may be in a range from approximately 20 GHz to approximately 100 GHz, such as in a range between approximately 76 GHz and approximately 81 GHz. As mentioned, a radar signal received by the RX antenna 104 includes radar echoes (e.g., chirp echo signals); that is to say, those signal components that are backscattered at one or more targets.

The received RF signal $y_{RF}(t)$ is downmixed into, for example, baseband to generate a baseband signal $y_{BB}(t)$, and the baseband signal $y_{BB}(t)$ is processed further in baseband by way of analog signal processing performed by the baseband signal processing circuit 110. In some implementations, the baseband signal processing circuit 110 may be configured to filter and/or amplify the baseband signal $y_{BB}(t)$ to generate an analog (baseband) output signal $y(t)$ that is derived from the baseband signal $y_{BB}(t)$. The baseband signal $y_{BB}(t)$ may also be referred to as analog radar data. If the received RF signals are down-converted into the IF band, the baseband signal processing circuit 110 may be referred to as an IF signal processing circuit. Thus, the baseband signal processing circuit 110, in general, may also be referred to as an analog signal processing circuit.

The ADC 112 may be configured to digitize the baseband signal $y_{BB}(t)$ or the analog output signal $y(t)$ to generate a digital baseband signal $y[n]$, also referred to as a digital output signal. The digital baseband signal $y[n]$ is representative of the radar data received in the received RF signal $y_{RF}(t)$. The DSP 114 may be configured to further process the digital baseband signal $y[n]$ in the digital domain. For example, the DSP 114 may be configured to receive the digital radar data in the digital baseband signal $y[n]$ and process the digital radar data using the ramp parameters (e.g., respective ramp start frequencies, the respective ramp stop frequencies, a bandwidth of a frequency range, a ramp start time, or a sampling start time) used to generate the respective frequency ramps of the received RF signal $y_{RF}(t)$ in order to generate a range Doppler map, which may then be further used by the DSP 114 for object detection, classification, and so on.

In some implementations, the controller 116 is configured to control operation of the radar sensor 100 (e.g., by controlling one or more other components of the radar sensor 100, as indicated in FIG. 3). The controller 116 may include, for example, a microcontroller unit (MCU).

In some implementations, the RF front-end 108, the baseband signal processing circuit 110, the ADC 112, and/or the DSP 114 may be integrated in a single radar MMIC 106 (e.g., an RF semiconductor chip). Alternatively, two or more of these components may be distributed over multiple radar MMICs 106. In some implementations, the DSP 114 may be included in the controller 116. In some implementations, the techniques associated with TX monitoring and/or RX monitoring may be performed by one or more components of the radar sensor 100, such as by the DSP 114, the controller 116, or the like.

As indicated above, FIG. 3 is provided as an example. Other examples may differ from what is described with regard to FIG. 3. The number and arrangement of devices and components shown in FIG. 3 are provided as an example. In practice, there may be additional devices or components, fewer devices or components, different devices or components, or differently arranged devices or components than those shown in FIG. 3. Furthermore, two or more devices or components shown in FIG. 3 may be implemented within a single device or component, or a single device or component shown in FIG. 3 may be implemented as multiple, distributed devices or components. Additionally, or alternatively, a set of devices or components (e.g., one or more devices or components) shown in FIG. 3 may perform one or more functions described as being performed by another set of devices or components shown in FIG. 3.

Figure 4:
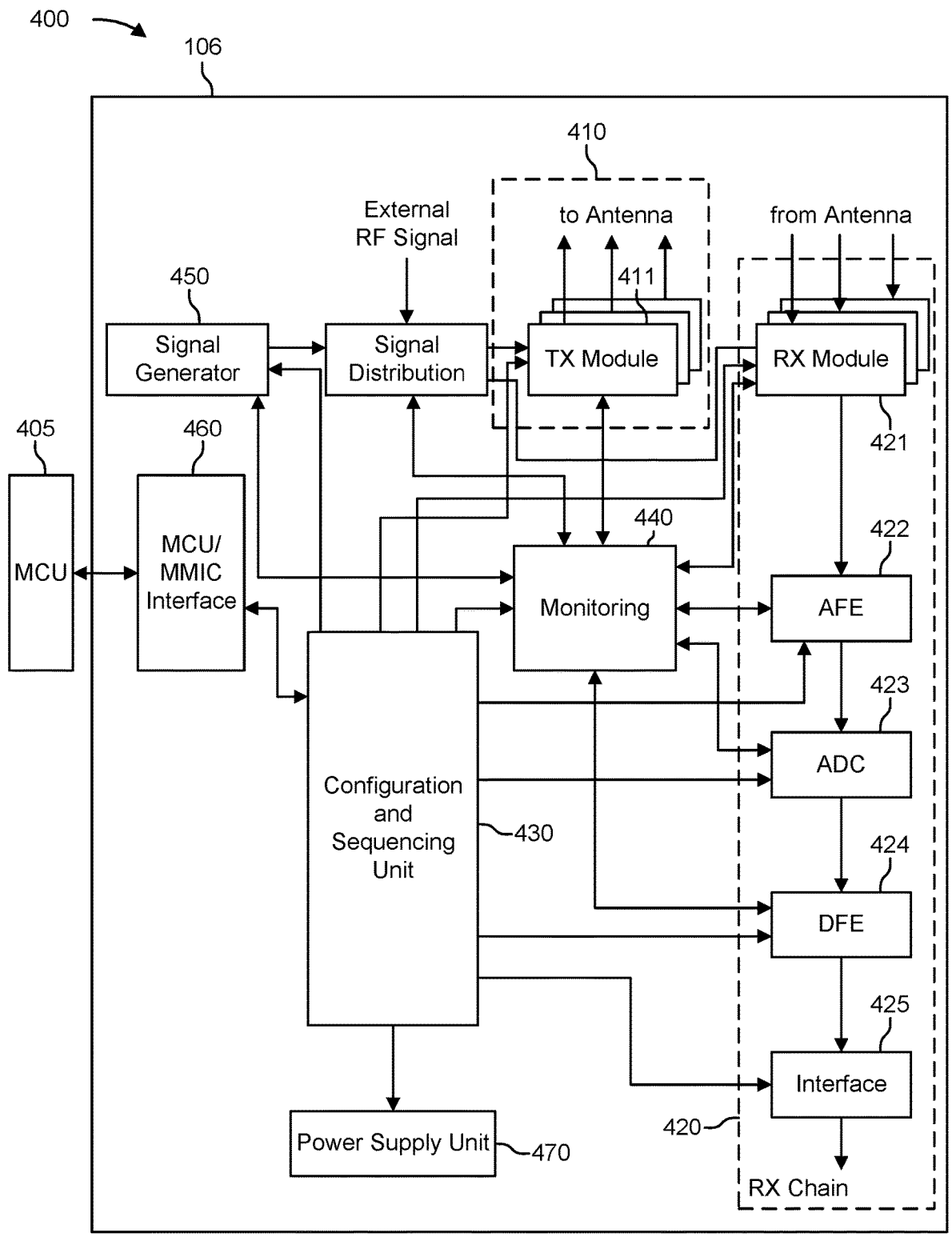
FIG. 4 shows a schematic block diagram of a radar system according to one or more embodiments.

FIG. 4 shows a schematic block diagram of a radar system 400 according to one or more implementations. The radar system 400 includes the radar MMIC 106 (e.g., a semiconductor chip) and an MCU 405. The radar MMIC 106 includes a transmitter 410 including at least one transmit channel 411 for radar signals and/or at least one receive channel 420 for radar signals and an MCU 405. The radar MMIC 106 can be regarded as part of a radar sensor. The MCU 405 may correspond to the controller 116 described in connection with FIG. 3.

The transmit channel 411 may include one or more circuit components and is configured to generate radar transmission signals and to output the radar transmission signals to one or more antennas. As indicated in FIG. 4, the transmitter 410 can comprise one or more the transmit channels 411. The receive channel 420 may include one or more circuit components and is configured to receive and process one or more radar reception signals from one or more antennas. As indicated in FIG. 4, the receive channel 420 can comprise one or more receivers 421, an analog front-end 422, an ADC 423, a digital front-end 424, and an interface 425.

The analog front-end 422 may include all of the circuit components needed for RF signal processing. Such circuit components may (but need not necessarily) include, for example, an LO, RF power amplifiers, LNAs, directional couplers such as rat-race-couplers and circulators, and mixers for the down-conversion of RF signals into the baseband or an IF band.

Antenna arrays may be used instead of single antennas. The depicted example shows a bistatic (or pseudo-monostatic) radar system which has separate RX and TX antennas. In the case of a monostatic radar system, a single antenna or a single antenna array may be used to both receive and transmit electromagnetic (radar) signals. In this case, a directional coupler (e.g., a circulator) may be used to separate RF signals to be transmitted to the radar channel from RF signals received from the radar channel. In practice, radar systems often include several TX channels and reception RX channels, which among other things allows for the measurement of the direction (e.g., DoA) from which the radar echoes are received.

In the case of an FMCW radar system, the transmitted RF signals radiated by the TX antenna may be in the range between approximately 20 GHz and 100 GHz (e.g., in the frequency band 21 to 26 GHz or in the frequency band 76 to 81 GHZ). As mentioned, the RF signal received by the RX antenna includes the radar echoes, for example, the signal back-scattered at the so-called radar targets.

The received RF signals are down-converted into the baseband (or the IF band) and further processed in the baseband using analog signal processing at the analog front-end 422, which basically includes filtering and amplification of the baseband signal. If the received RF signals are down-converted into the IF band, the baseband signal processing chain of the analog front-end 422 may be referred to as an IF signal processing chain. Thus, the processing chain of the analog front-end 422 may, in general, be referred to as an analog signal processing chain.

The baseband signal is finally digitized using the ADC 423 and further processed in the digital domain at the digital front-end 424. The digital front-end 424 includes a digital signal processing chain implemented, for example, in a DSP.

Furthermore, radar MMIC 106 may include a configuration and sequencing circuit 430 configured centrally to handle configuration requests, execution of commands, storing of programming contexts, execution of programming contexts, activation and deactivation of programming contexts and/or of RAM partitions, and return responses to the MCU. The configuration and sequencing circuit 430 may include one or more CPUs configured to execute programming contexts (e.g., programs and/or firmware) for carrying out various MMIC operations. The configuration and sequencing circuit 430 may also include one or more memory devices, including a non-volatile memory (e.g., ROM), a volatile memory (e.g., RAM), and one or more hardware registers. In addition, the volatile memory may include a plurality of volatile memory partitions (e.g., RAM partitions). The volatile memory partitions may be physical partitions, with physical memory addresses, or logical partitions, where each logical partition is assigned a different subset of logical memory addresses of the volatile memory. The non-volatile memory may be used to store a default programming context, which may be copied or loaded into one of the volatile memory partitions for execution by a CPU. Additionally, the volatile memory partitions may receive downloadable programming contexts from the MCU 405, which may then be executed by the CPU.

The configuration and sequencing circuit 430 may include an FW command handler that separately processes configuration requests and execution requests from the MCU 405. The FW command handler may be a processing module of the configuration and sequencing circuit 430. The configuration and sequencing circuit 430 may send the results of executed configuration and execution requests back to the MCU 405. Here, the MCU 405 is configured as a radar driver for driving the radar functionality of the radar MMIC 106.

In particular, the configuration and sequencing circuit 430 may determine a sequencing scheme for (e.g., all) time-dependent functions of the transmitter 410 (i.e., the one or more transmit channels 411) and/or of the receive channel 420, and also to drive circuit elements of the transmitter 410 (i.e., the one or more transmit channels 411) and/or of the receive channel 420 in accordance with the sequencing scheme. A time-dependent function of a transmit channel 411 and/or of the receive channel 420 is a function which is to be performed or carried out in a manner temporally coordinated or synchronized with one or more other time-dependent functions of a transmit channel 411 and/or of a receive channel 420 in order to ensure correct operation of the radar sensor or radar system. Accordingly, the sequencing scheme represents the temporally coordinated or synchronized order of performance of the individual time-dependent functions.

By way of example, the time-dependent functions can comprise a function of a transmit channel 411 relating to generating a radio-frequency radar transmission signal, a function of a receive channel 420 relating to processing a radio-frequency radar reception signal, a monitoring function for one or more circuit components of a transmit channel 411 and/or of a receive channel 420, a monitoring function for a signal processed by a transmit channel 411 and/or a receive channel 420, or a calibration of a transmit channel 411 and/or a receive channel 420. For example, the time-dependent function may include a transmit calibration function for calibrating the transmit channel, a receive calibration function for calibrating the receive channel, a transmit monitoring function for monitoring the transmit channel, a receive monitoring function for monitoring the receive channel, a ramp function for generating ramp segments of a ramp signal (e.g., of a radar signal), an event monitoring function for monitoring for a trigger event, a read function to read data from a read memory location of the radar MMIC 106, or a write function to write data to a write memory location of the radar MMIC 106.

The configuration and sequencing circuit 430 may receive configuration commands from the MCU 405, each being directed to one or more executable command or operation types (e.g., calibrate, ramp, monitor, read, write, etc.) and/or configuration parameters for establishing (i.e., configuring) a configured command. A configured command may comprise a single executable command or operation type, referred to as a "handle", or multiple handles, for example a "batch" or a "fork". Thus, a batch or a fork command may be configured as a bundle of handles (i.e., a bundled configuration command), where each handle corresponds to a different time-dependent function (i.e., a unique combination of operation type and parameter set).

A read command may instruct the radar MMIC 106 to read out data from a specific memory location (e.g., an area including one or more specified registers) of the radar MMIC 106 and transmit the data to the MCU 405. A write command may instruct the radar MMIC 106 to write data received from the MCU 405 to a specific memory location (e.g., an area including one or more specified registers) of the radar MMIC 106

Each configured command may comprise one or more sequence sets or execution flows of time-dependent functions. Each sequence set may comprise a command type along with one or more configuration parameters that make up a configuration parameter set.

An execution flow may correspond to a batch command that triggers multiple time-dependent functions to be carried out in sequential order, in parallel, or a combination thereof. Alternatively, an execution flow may correspond to a fork command that triggers one or more time-dependent functions to be carried out on a conditional basis based on a trigger condition or event.

Configuration parameters may include calibration parameters for circuit components of the transmit channel 411, frequency parameters for a radar signal, phase parameters, amplitude parameters, filter configurations, or power parameters that are ultimately stored in registers of the configuration and sequencing circuit 430.

The configuration parameters for a calibration command may include calibration parameters for one or more circuit components (e.g., an ADC, a power amplifier, voltage-controlled oscillator (VCO), filter and the like), including circuit components of a transmit channel 411 and a receive channel 420. Calibration parameters may include an offset current, anti-backlash, amplification of the VCO, activation of a signal source, etc.

The configuration parameters for a monitoring command may include parameters for performing a monitoring function and may identify one or more circuit components targeted for monitoring and from which monitoring feedback is to be received and evaluated.

Furthermore, a radar signal includes a plurality of successive signal sections. Configuration parameters for a ramp command may include frequency parameters for the respective signal section indicating a start frequency $f_{START}$, a stop frequency $f_{STOP}$, phase parameters indicating a phase setting for the transmit signals, a duration TRAMP of the successive signal sections, a slope of a frequency ramp, and/or a duration of a pause between adjacent signal sections. By way of example, a signal section can correspond to a ramp segment of a frequency ramp of the radar signal. The ramp segments may be ramps with a rising frequency (up-ramp) or a falling frequency (down-ramp). Whether the ramp segments are up-ramps or down-ramps may be implied by the start frequency and the stop frequency or may be indicated by a configuration parameter.

The configuration parameters for a read command may specify a memory area or a register location of the radar MMIC 106 from which data is to be read.

The configuration parameters for a write command may specify a memory area or a register location of the radar MMIC 106 to which data is to be written.

A programming context may include a respective program (e.g., firmware) and associated data. For example, the respective program may include one or more commands and program functions used by those commands. When a programming context is downloaded from the MCU 405 to the radar MMIC 106, its commands are loaded into an executable part of a RAM partition. Commands of the programming context can be executed by the radar MMIC 106 only when the programming context is activated by the configuration and sequencing circuit 430 (e.g., at the instruction of the MCU 405). The associated data of a programming context may be context-sensitive application data that may define one or more variables or one or more data sets of the respective program. The context-sensitive application data may include radar application cycle data, including ramp scenarios, settings, or configurations applicable to the programming context, configured commands, and/or other characteristics of the programming context such as auto-run information and validity checks. A "different" programming context may be defined as having a different respective program and/or different associated data when compared to another programming context. Thus, a same programming context or a different programming context may be executed by the configuration and sequencing circuit 430 according to a context execution sequence that is defined by the MCU 405.

The configuration and sequencing circuit 430 can be implemented, for example, as a dedicated circuit or a circuit for executing software in conjunction with associated implemented software configured to determine a sequencing scheme and to drive circuit elements of a transmit channel 411 and/or of a receive channel 420 in accordance with the sequencing scheme.

By instruction from the MCU 405, the configuration and sequencing circuit 430 may be configured to add a programming context to a RAM partition of the radar MMIC 106. When a programming context is added to the RAM partition, the programming context is downloaded from the MCU 405 to the radar MMIC 106 and stored in one or a plurality of RAM partitions of the radar MMIC 106. However, adding a programming context to the radar MMIC 106 does not change any configuration of the radar MMIC 106 until the programming context is activated. When a programming context is downloaded by the radar MMIC 106, the programming context may be initially set into a deactivated state.

In some implementations, a default programming context is stored in a ROM of the radar MMIC 106. The default programming context may include a default program and associated default data stored in the ROM. The configuration and sequencing circuit 430 may automatically load the default programming context from the ROM into one of the RAM partitions for execution. For example, the default programming context may be automatically loaded into one of the RAM partitions during a startup or during a reset of the radar MMIC 106 (e.g., during a boot sequence of the radar MMIC 106). To distinguish the default programming context from programming contexts received from the MCU 405, the programming contexts received from (e.g., downloaded from) the MCU 405 and stored in one of the RAM partitions of the radar MMIC 106 may be referred to as "downloadable programming contexts."

By instruction from the MCU 405, the configuration and sequencing circuit 430 may be configured to activate a programming context. When a programming context is activated, the program and the associated data of the programming context may be used by the radar MMIC 106 to perform, for example, time-dependent functions defined by the program. In some implementations, the configuration and sequencing circuit 430 may perform one or more additional actions when activating a programming context. For example, the configuration and sequencing circuit 430 may automatically deactivate a previously active programming context when activating a next programming context. A programming context may be activated by activating the RAM partition in which the programming context is stored. For example, a RAM partition may be activated by writing an address or an index of the RAM partition into a hardware register or into a fixed memory location of the radar MMIC 106 that stores active context information. Thus, only one programming context may be activated at a time.

In some implementations, the default programming context may be automatically added to a RAM partition during the startup or during the reset of the radar MMIC 106 (e.g., during the boot sequence of the radar MMIC 106), and the RAM partition that stores the default programming context may be automatically activated while one or more programming contexts are downloaded to the radar MMIC 106 from the MCU 405. In other words, the default programming context may be automatically loaded from the ROM into one RAM partition and activated for execution during the startup or reset of the radar MMIC 106. As a result, faster startup times of the radar MMIC 106 may be realized.

By instruction from the MCU 405, the configuration and sequencing circuit 430 may be configured to deactivate a programming context. Deactivating the programming context may invalidate the program and the associated data of the programming context so that the program and the associated data of the programming context can no longer be used. In some implementations, a deactivation of one programming context and an activation of another programming context may be performed automatically in a sequence (e.g., first, a currently active programming context is deactivated, and then the next programming context is activated).

In some implementations, the default programming context may be loaded from the ROM to a RAM partition for activation when no additional programming contexts have been downloaded from the MCU 405.

A programming context may be deactivated by deactivating the RAM partition in which the programming context is stored. For example, a RAM partition may be deactivated by deleting or overwriting an address or an index of the RAM partition from the hardware register or the fixed memory location of the radar MMIC 106 that stores the active context information.

By instruction from the MCU 405, the configuration and sequencing circuit 430 may be configured to delete a deactivated programming context. For example, after a programming context has been executed and deactivated, the configuration and sequencing circuit 430 may delete the programming context from the RAM partition in which the programming context is stored to free up the RAM partition for another programming context to be received from the MCU 405. In some implementations, the programming context may be deleted from a RAM partition by overwriting the programming context with another programming context received from the MCU 405.

Radar operation of the at least one transmit channel 411 situated on the radar MMIC 106 and/or of the at least one receive channel 420 situated on the radar MMIC 106 may be controlled centrally by the configuration and sequencing circuit 430 arranged on the radar MMIC 106. 430

The radar MMIC 106 can be used, for example, for a (phase- or frequency-) modulated continuous wave radar system. Accordingly, a transmit channel 411 and/or a receive channel 420 can be part of a modulated continuous wave radar system, for example, of an FMCW radar in the automotive field. The configuration and sequencing circuit 430 can accordingly be understood as a central sequencing unit which can coordinate all substantial time-critical functions of the automotive FMCW radar front-end, such that a radar operation is an autonomous process which, for example, does not necessitate the participation of an external processor for performing the time-critical functions.

In addition to controlling a desired frequency profile of a radar transmission signal, the configuration and sequencing circuit 430 shown in FIG. 4 can control various other aspects of a radar sensor or radar system in a synchronized manner.

By way of example, in the transmitter 410, and specifically in a transmit channel 411, a power amplifier can be switched on and off in a synchronized manner, or a phase shift (implemented by a phase shifter) of radar transmission signals can be carried out in a synchronized manner.

The monitoring of a transmit channel 411 and/or of a receive channel 420 can be carried out by a monitoring circuit 440. The latter can accordingly be driven by the configuration and sequencing circuit 430 to trigger or to activate or deactivate a channel monitoring function in a synchronized manner in accordance with the sequencing scheme. By way of example, monitoring functions can be activated or deactivated in a synchronized manner during a ramp formation, during a calibration (e.g., amplification of a voltage-controlled oscillator), during a cascaded operation, or during a configuration of external components or slaves (e.g., via an SPI or demultiplexing).

In the signal generating circuit 450, in a synchronized manner, for example, the bandwidth of a phase-locked loop (PLL) can be set (e.g., charge pump current) or more extensive modulation concepts can be activated or deactivated (e.g., 2-point modulation, resetting current). Likewise, in a synchronized manner, for example, loop filter reset circuits can be activated or deactivated or monitoring functions can be activated or deactivated. Moreover, in a synchronized manner, by way of example, voltages can be roughly set, calibration parameters (e.g., offset current, anti-backlash, amplification of a voltage-controlled oscillator) can be set, or a signal source (e.g., when using a plurality of PLLs) can be selected.

In the receiver 421, in a synchronized manner, by way of example, digital or analog filters can be set (resetting, configuration, bypass, etc.) or decimation rates can be set. Low voltage differential signaling (LVDS) modes or calibrations can be chosen in a synchronized manner. Likewise, in a synchronized manner, the receive channel 420 can also be activated or deactivated in its entirety, or a reception frame delay can be set. By way of example, the ADC 423 can also be configured, calibrated, activated, or deactivated in a synchronized manner.

Likewise, general purpose inputs/outputs (GPIOs) can be configured in a synchronized manner, circuit components for generating frequency ramps can be triggered, or diverse circuit components (e.g., ADC 423) can be switched on or off. Moreover, interrupts can be generated or other chip functionality can be triggered.

In order to synchronize the time-dependent functions presented by way of example above, the configuration and sequencing circuit 430 can comprise an instruction-processing unit (not shown) with a specific instruction set for determining the sequencing scheme. The instruction set can describe the configuration flow over time and be, for example, similar to the instruction set of a general purpose processor. By way of example, the instruction set can comprise first specific instructions for the configuration of the circuit elements of a transmit channel 411 and/or of a receive channel 420 and second specific instructions for the configuration of frequency parameters of a radio-frequency radar transmission signal generated by the transmit channel 411.

The configuration and sequencing circuit 430 can thus be understood as a radar-specific sequencing unit having an instruction set associated with a specific purpose in order to handle time-critical configurations in a highly integrated radar chip.

A controller/MMIC interface 460 shown in FIG. 4 can additionally be used to transmit commands and responses between the MCU 405 and the configuration and sequencing circuit 430 via a communication channel or a communication bus, such as an SPI, an LVDS, or another type of communication interface.

A power supply unit 470 supplies power to the chip components and may be configurable by the configuration and sequencing circuit 430.

Various transactions can be performed between the MCU 405 and the configuration and sequencing circuit 430 through the controller/MMIC interface 460. A transaction is defined by one or more messages, sent and received between MCU 405 and the radar MMIC 106 to trigger a command that executes a single task or a set of tasks, and to receive the result of the task/s executed. Results stemming from the executed command type may be provided from the radar MMIC 106 to the MCU 405 using an SPI channel, an LVDS channel, or a digital output pin of the controller/MMIC interface 460.

As indicated above, FIG. 4 is provided as an example. Other examples may differ from what is described with regard to FIG. 4. The number and arrangement of devices and components shown in FIG. 4 are provided as an example. In practice, there may be additional devices or components, fewer devices or components, different devices or components, or differently arranged devices or components than those shown in FIG. 4. Furthermore, two or more devices or components shown in FIG. 3 may be implemented within a single device or component, or a single device or component shown in FIG. 4 may be implemented as multiple, distributed devices or components. Additionally, or alternatively, a set of devices or components (e.g., one or more devices or components) shown in FIG. 4 may perform one or more functions described as being performed by another set of devices or components shown in FIG. 4.

Figure 5:
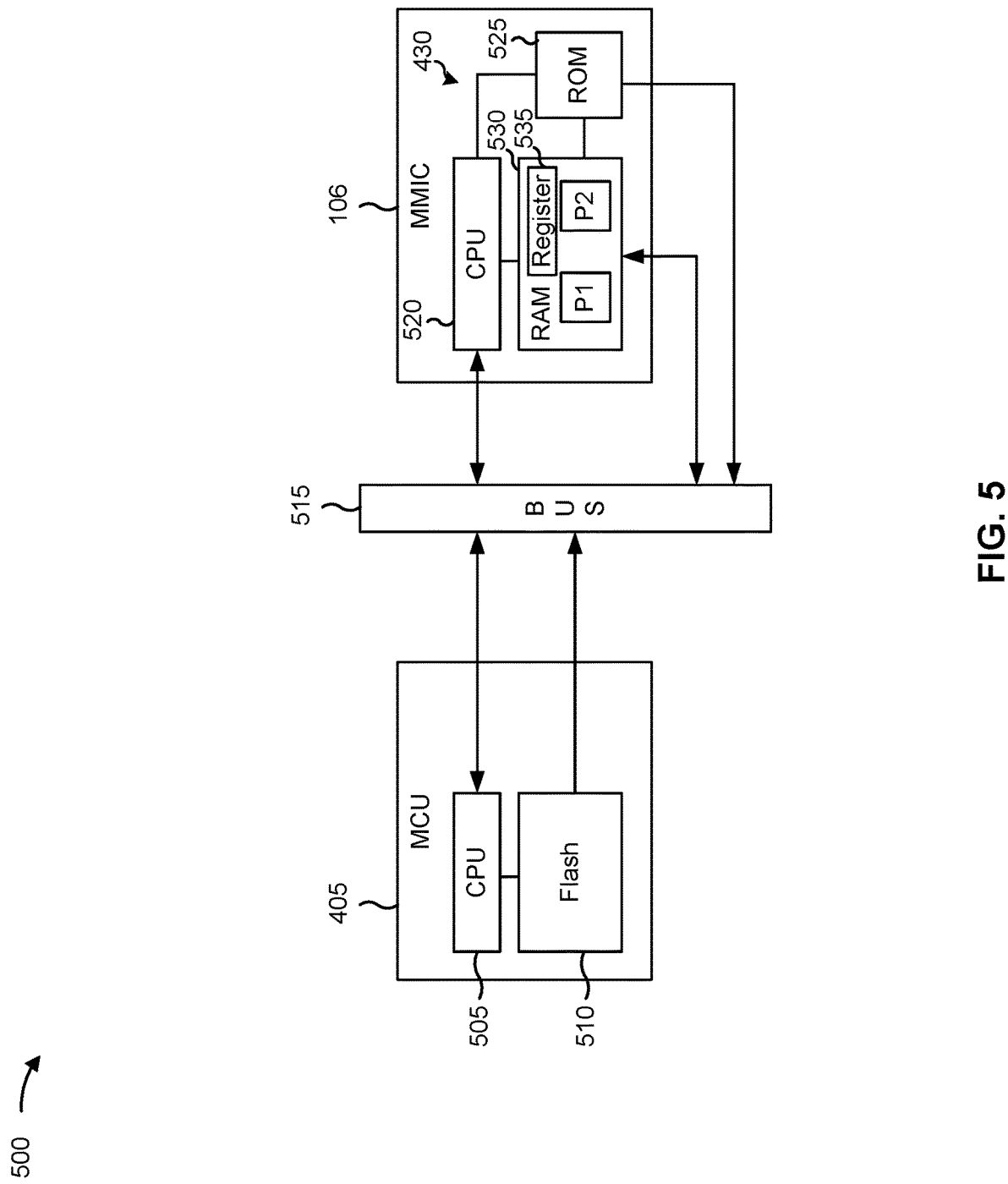
FIG. 5 shows a schematic block diagram of a radar system according to one or more embodiments.

FIG. 5 shows a schematic block diagram of a radar system 500 according to one or more embodiments. The radar system 500 includes the radar MMIC 106 (e.g., a semiconductor chip) and the MCU 405. The diagram of the radar MMIC 106 has been simplified as compared to the diagram of the radar MMIC 106 shown in FIG. 4 in order to focus on components corresponding to the configuration and sequencing circuit 430 and to storing and execution of programming contexts.

The MCU 405 includes a CPU 505 and a non-volatile memory 510 (e.g., a flash memory). The CPU 505 may be configured to control the non-volatile memory 510 to perform write operations for transferring (e.g., uploading) downloadable programming contexts to the radar MMIC 106 via a communication bus 515. For example, the non-volatile memory 510 may be configured to store a plurality of downloadable programming contexts, and the non-volatile memory 510 may be configured to transmit the plurality of downloadable programming contexts to the radar MMIC 106 via the communication bus 515 based on instructions received from the CPU 505. In some implementations, the non-volatile memory 510 may be configured to sequentially transmit the plurality of downloadable programming contexts to the radar MMIC 106 one at a time or, in some cases, in parallel. In some implementations, the non-volatile memory 510 may be configured to sequentially transmit the plurality of downloadable programming contexts to the radar MMIC 106 in accordance with a context execution sequence, which is a sequence in which the plurality of downloadable programming contexts will be executed by the radar MMIC 106. For example, a time slot may be assigned to each downloadable programming context. The time slots may indicate a temporal order in which the plurality of downloadable programming contexts are to be executed. Thus, a downloadable programming context may be activated during the time slot allocated to a downloadable programming context in the context execution sequence and may be deactivated in all other instances.

The plurality of downloadable programming contexts may be created at build-time of an application software of the MCU 405, such that minimal runtime overhead occurs. The plurality of downloadable programming contexts may be stored in the non-volatile memory 510 unencrypted or with some kind of encryption, scrambling, compression, or any combination thereof.

The CPU 505 may be configured to communicate with the radar MMIC 106 via a communication bus 515. For example, the CPU 505 may transmit commands to the radar MMIC 106. In some implementations, the commands may indicate the context execution sequence of the plurality of downloadable programming contexts. In some implementations, the commands may instruct the radar MMIC 106 to report back results of an executed downloadable programming context.

The radar MMIC 106 includes a CPU 520, a non-volatile memory 525 (e.g., ROM), and a volatile memory 530 (e.g., RAM) that includes a plurality of partitions, including a first partition P1 and a second partition P2. While only two partitions are illustrated, the volatile memory 530 may include three or more partitions. The partitions may be physical partitions, with physical memory addresses, or logical partitions, where each logical partition is assigned a different subset of logical memory addresses of the volatile memory 530. The CPU 520 may form part of the configuration and sequencing circuit 430 described in connection with FIG. 4. In some implementations, the non-volatile memory 525 and the volatile memory 530 may also be regarded as part of the configuration and sequencing circuit 430.

In some implementations, a default programming context may be stored in an external source (e.g., a source external to the volatile memory 530). The default programming context may include a default program and associated default data stored in the external source. The external source may be the non-volatile memory 525, the MCU 405, or another external device (e.g., an external flash memory device). The external source may be configured to load or copy the default programming context into one of the partitions (e.g., the first partition P1 or the second partition P2) at a startup or at a reset of the radar MMIC 106 as part of a boot sequence of the radar MMIC 106 that is controlled by the CPU 520.

For example, the non-volatile memory 525 may be configured to store the default programming context. The non-volatile memory 525 may be configured to automatically load or copy the default programming context into one of the partitions (e.g., the first partition P1 or the second partition P2) at a startup or at a reset of the radar MMIC 106 as part of a boot sequence of the radar MMIC 106 that is controlled by the CPU 520. Thus, as part of the boot sequence, the CPU 520 may be configured to automatically activate the partition in which the default programming context is stored in order to activate the default programming context and execute the activated default programming context. While the default programming context is being executed, the radar MMIC 106 may be configured to download one or more downloadable programming contexts from the MCU 405, via the communication bus 515, and store the one or more downloadable programming contexts in a respective partition of the volatile memory 530.

A downloadable programming context may be downloaded into an inactive partition of the volatile memory 530. The partitions are configured to store programming contexts on a one-by-one basis. In other words, each partition is configured to store only a single programming context at a time. Since only one partition can be active at a time, only one programming context may be active at a time. In addition, a quantity of the plurality of downloadable programming contexts may be greater than a quantity of the plurality of partitions. As a result, the plurality of downloadable programming contexts may be transmitted sequentially to the volatile memory 530.

In some implementations, the volatile memory 530 may include or may be associated with a hardware register 535 that is configured to store activation information indicating which partition is activated. For example, a partition may be activated by writing an address or an index of the partition into the hardware register 535. All other partitions that do not have a corresponding address or a corresponding index written into the hardware register 535 may be considered deactivated. Thus, a partition may be deactivated by removing or overwriting the corresponding address or a corresponding index from the hardware register 535. The address or the index of the activated partition may be written to the hardware register 535 by the CPU 520. For example, the CPU 520 may be configured to write an address or an index of a partition to be activated in accordance with a command or a context execution sequence received from the CPU 505 of the MCU 405. Alternatively, the CPU 505 may have access to the hardware register 535 via the communication bus 515. Thus, the CPU 505 may be configured to write to the hardware register 535 in order to activate and/or deactivate the partitions of the volatile memory 530 in accordance with the context execution sequence. Thus, the hardware register 535 activates and deactivates the partitions as the activation information is updated in the hardware register 535. The CPU 520 may determine which programming context (e.g., which partition) is activated by referring to the hardware register 535. The CPU 520 may be configured to execute the programming context stored in the activated partition that is identified in the hardware register 535. In addition, the CPU 520 may be configured to transmit an execution result of the activated programming context to the CPU 505 in response to completing the execution of the activated programming context.

The radar MMIC 106 includes a communication interface (e.g., the controller/MMIC interface 460) that is configured to sequentially receive a plurality of downloadable programming contexts from the MCU 405 (e.g., from the non-volatile memory 510). Each downloadable programming context includes a respective program and associated data. The plurality of partitions of the volatile memory 530 may be configured to sequentially store the plurality of downloadable programming contexts that are received from the MCU 405. In some implementations, one or more of the plurality of downloadable programming may be received in parallel. For example, the plurality of downloadable programming contexts may be transmitted in batches (e.g., one at a time, two at a time, three at a time, etc.). In some implementations, the plurality of downloadable programming contexts may be received sequentially according to the context execution sequence to be performed by the CPU 520.

Each subsequent downloadable programming context received from the MCU 405 is stored in a different partition than a partition used to store a most-recent downloadable programming context received from the MCU 405. For example, if the second partition P2 is used to store the most-recent downloadable programming context, the first partition P1 (or a third partition, not explicitly illustrated) may be used to store the next subsequent downloadable programming context received from the MCU 405. An activated partition cannot be written to because the programming context stored in the activated partition is being executed.

Thus, the configuration and sequencing circuit 430 is configured to sequentially activate and deactivate the plurality of downloadable programming contexts according to the context execution sequence, and execute an activated downloadable programming context stored in a corresponding activated partition. The communication interface may be configured to receive, and the volatile memory 530 may be configured to store, a subsequent downloadable programming context prior to a time slot in the context execution sequence that is assigned to the subsequent downloadable programming.

The configuration and sequencing circuit 430 may be configured to deactivate a previous downloadable programming context having been executed immediately prior to activating and executing a next downloadable programming context in the context execution sequence. In some implementations, the volatile memory 530 may be configured to overwrite the previous downloadable programming context with the subsequent downloadable programming context by storing the subsequent downloadable programming context in a same partition as the previous downloadable programming context. Thus, the context execution sequence may include executing the previous downloadable programming context, followed by executing the next downloadable programming context, followed by executing the subsequent downloadable programming context. In some implementations, a download sequence (e.g., a transmission sequence) of the plurality of downloadable programming contexts may include receiving the previous downloadable programming context, followed by receiving the next downloadable programming context, followed by receiving the subsequent downloadable programming context. In some implementations, the next downloadable programming context to be activated and executed may be the most-recent downloadable programming context received from the MCU 405.

In some implementations, the configuration and sequencing circuit 430 may be configured to activate the next downloadable programming context and deactivate the previous downloadable programming context in response to completing an execution of the previous downloadable programming context in the context execution sequence. In some implementations, the communication interface may be configured to receive, and the volatile memory 530 may be configured to store, the next downloadable programming context during an execution of the previous downloadable programming context. In some implementations, the configuration and sequencing circuit 430 may be configured to deactivate the previous downloadable programming context by deactivating a partition of the plurality of partitions in which the previous downloadable programming context is stored.

In some implementations, the configuration and sequencing circuit 430 may be configured to activate the subsequent downloadable programming context by activating a partition of the plurality of partitions in which the subsequent downloadable programming context is stored.

In some implementations, the plurality of partitions includes only two partitions (e.g., the first partition P1 and the second partition P2) that are configured to store the plurality of downloadable programming contexts in an alternating sequence according to the context execution sequence. During a start-up operation or a reset of the radar MMIC 106, the configuration and sequencing circuit 430 may be configured to load the default programming context from an external source, such as the non-volatile memory 525, to the first partition P1 and execute the default programming context from the first partition P1. During execution of the default programming context from the first partition P1, the communication interface of the radar MMIC 106 may be configured to receive a first downloadable programming context of the plurality of downloadable programming contexts from the MCU 405, and the volatile memory 530 may be configured to store the first downloadable programming context in the second partition P2.

In response to completing an execution of the default programming context, the configuration and sequencing circuit 430 may be configured to deactivate the default programming context stored in the first partition P1, activate the first downloadable programming context stored in the second partition P2, and execute the activated first downloadable programming context from the second partition P2. Moreover, during execution of the first downloadable programming context from the second partition P2, the communication interface of the radar MMIC 106 may be configured to receive a second downloadable programming context of the plurality of downloadable programming contexts from the MCU 405, and the volatile memory 530 may be configured to store the second downloadable programming context in the first partition P1.

In response to completing an execution of the first downloadable programming context, the configuration and sequencing circuit 430 may be configured to deactivate the first downloadable programming context stored in the second partition P2, activate the second downloadable programming context stored in the first partition P1, and execute the activated second downloadable programming context from the first partition P1. Moreover, during execution of the second downloadable programming context from the first partition P1, the communication interface of the radar MMIC 106 may be configured to receive a third downloadable programming context of the plurality of downloadable programming contexts from the MCU 405, and the volatile memory 530 may be configured to store the third downloadable programming context in the second partition P2. A similar pattern may be used for receiving, storing, and executing additional downloadable programming contexts.

In addition, in some implementations, at least one downloadable programming context of the plurality of downloadable programming contexts may be configured to access and execute the default program stored in the non-volatile memory 525.

In some implementations, one or more downloadable programming contexts of the plurality of downloadable programming contexts may define at least one corresponding frequency ramp sequence of a corresponding ramp signal. Accordingly, the transmit channel 411 may be configured to generate the corresponding ramp signal that corresponds to the activated downloadable programming context as a radar signal.

In some implementations, a first downloadable programming context defines a first ramp function for generating first ramp segments of a first ramp signal to be generated by the transmit channel 411 based on the first downloadable programming context being executed by the configuration and sequencing circuit 430 (e.g., by the CPU 520). Additionally, a second downloadable programming context may define a second ramp function for generating second ramp segments of a second ramp signal to be generated by the transmit channel based on the second downloadable programming context being executed by the configuration and sequencing circuit 430 (e.g., by the CPU 520). The first ramp signal may be defined by a first set of parameters provided in the associated data of the first downloadable programming context. The second ramp signal may be defined by a second set of parameters provided in the associated data of the second downloadable programming context. The first set of parameters may be different from the second set of parameters such that the first ramp signal is different from the second ramp signal.

In some implementations, each downloadable programming context of the plurality of downloadable programming contexts includes a set of time-dependent functions. The time-dependent functions include at least one of: a transmit calibration function for calibrating the transmit channel, a receive calibration function for calibrating the receive channel, a transmit monitoring function for monitoring the transmit channel, a receive monitoring function for monitoring the receive channel, a ramp function for generating ramp segments of a ramp signal, an event monitoring function for monitoring for a trigger event, a read function to read data from a read memory location of the radar MMIC, or a write function to write data to a write memory location of the radar MMIC.

In some implementations, the CPU 520 may be configured to transmit an execution result of the activated downloadable programming context to the MCU 405 (e.g., to CPU 505) in response to completing the execution of the activated downloadable programming context.

As indicated above, FIG. 5 is provided as an example. Other examples may differ from what is described with regard to FIG. 5.

Figure 6:
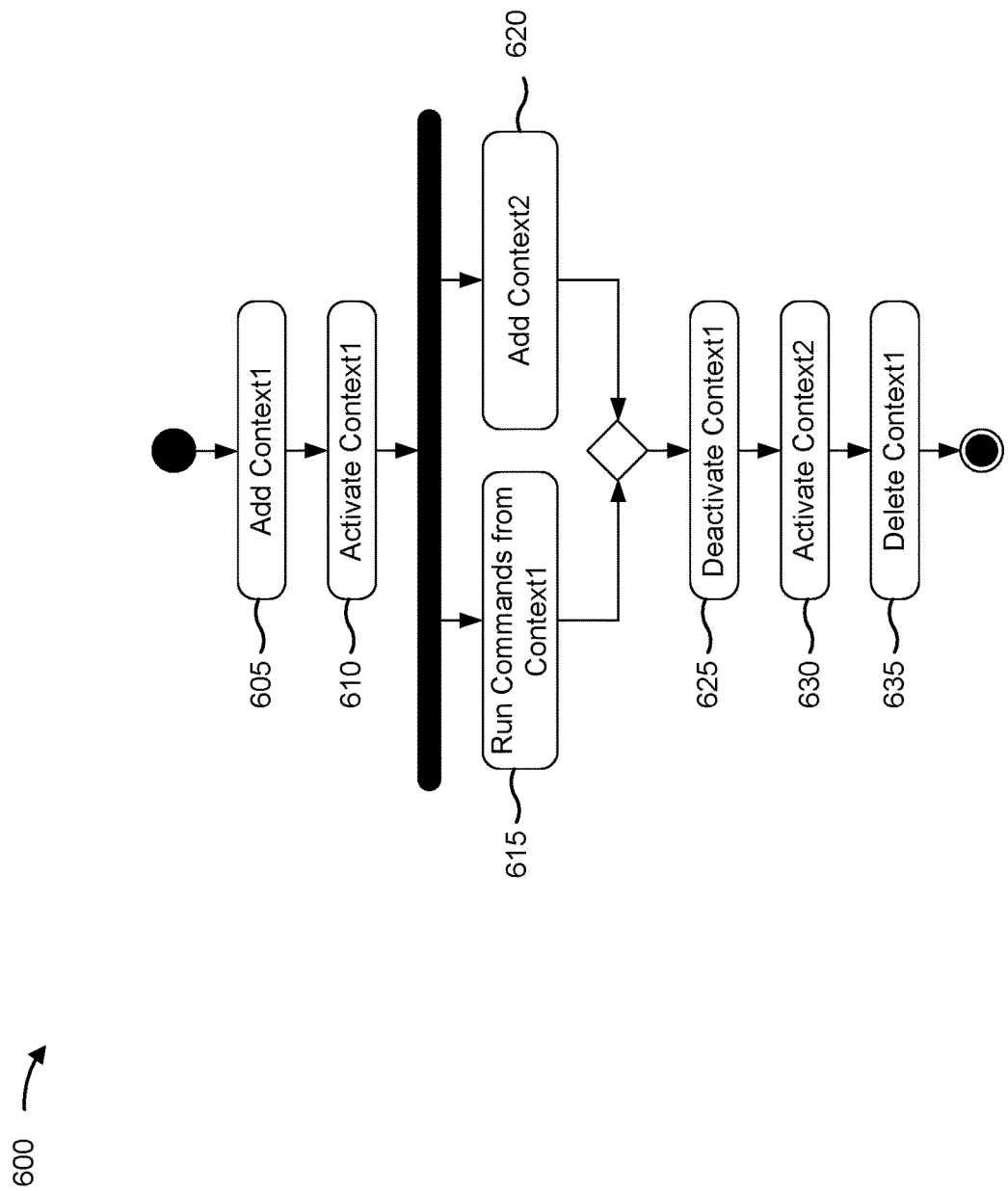
FIG. 6 illustrates a flowchart of an example process associated with context-based programming according to one or more implementations.

FIG. 6 illustrates a flowchart of an example process 600 associated with context-based programming according to one or more implementations. In some implementations, one or more process blocks of FIG. 6 are performed by a radar MMIC (e.g., radar MMIC 106). For example, one or more process blocks of FIG. 6 may be performed by the configuration and sequencing circuit 430. In some implementations, one or more process blocks of FIG. 6 may be performed by another device or a group of devices separate from or including the radar MMIC, such as MCU 405. Additionally, or alternatively, one or more process blocks of FIG. 6 may be performed by one or more components of the radar MMIC, such as CPU 520 (or another processor), non-volatile memory 525, and/or volatile memory 530.

As shown in FIG. 6, the process 600 may include adding a first programming context Context1 to a first RAM partition (block 605), activating the first programming context Context1 (block 610), and running commands (e.g., executing) from the first programming context Context1 (block 615). While the first programming context Context1 is active and being executed, the process 600 may include adding a second programming context Context2 to a second RAM partition (block 620). After execution of the first programming context Context1 has been completed, the process 600 may include deactivating first programming context Context1 (block 625), activating the second programming context Context2 (block 630), and running commands (e.g., executing) from the second programming context Context2 (block 635). During deactivation of the first programming context Context1, the first programming context Context1 may be deleted from the first RAM partition.

As indicated above, FIG. 6 is provided as an example. Other examples may differ from what is described with regard to FIG. 6.

Figure 7:
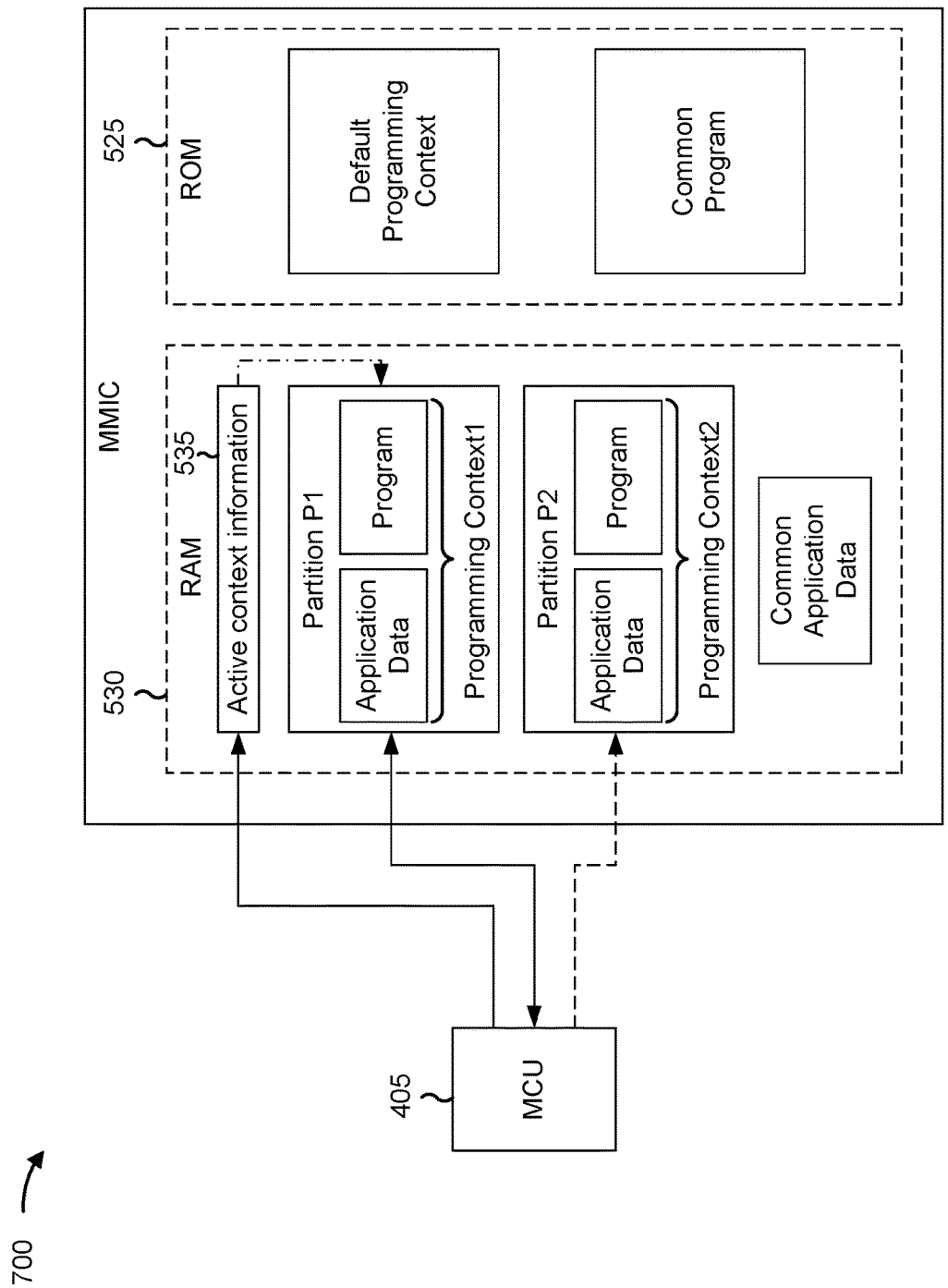
FIG. 7 shows a schematic block diagram of a radar system according to one or more embodiments.

FIG. 7 shows a schematic block diagram of a radar system 700 according to one or more embodiments. The radar system 700 may be similar to the radar system 500 described in connection with FIG. 5. Thus, the radar system 700 includes the radar MMIC 106 (e.g., a semiconductor chip) and the MCU 405.

The radar MMIC 106 has two or more RAM partitions in the volatile memory 530 (e.g., in RAM). For example, two partitions including the first partition P1 and the second partition P2 are shown. Each partition stores context-specific application data and a program corresponding to a respective programming context. The partitions can be implemented by physical or logical separation of RAM blocks. There can be more than one RAM block allocated to the context-specific application data and the program of the respective programming context. For example, the first partition P1 may have more than one RAM block for storing the context-specific application data and more than one RAM block for storing the program.

In order to activate one of the RAM partitions, the radar MMIC 106 may store active context information (such as an address or an index of a RAM partition) in the hardware register 535 or in a fixed memory location. Only one context can be active at a time.

On startup, a startup program of the radar MMIC 106 may load the default programming context from the non-volatile memory 525 (e.g., ROM) into one of the RAM partitions and set active context information to correspond to the RAM partition containing the default programming context.

The MCU 405 can interact with the radar MMIC 106 in the following ways: add a new programming context to an inactive RAM partition, interact with the current programming context by executing commands and obtaining results using the context-specific application data, change the active programming context by writing active context information into the hardware register 535, and/or trigger the radar MMIC to perform other MMIC features not handled by firmware (e.g., a hardware trigger).

In addition to the programming contexts, the radar MMIC 106 may have common application data and programs. The common application data and programs may always be available, regardless of which programming context is loaded or activated. The common programs may include necessary routines or functions required by many contexts (e.g., for reading and writing registers). The common application data may include a program stack and global variables.

As indicated above, FIG. 7 is provided as an example. Other examples may differ from what is described with regard to FIG. 7.

Figure 8:
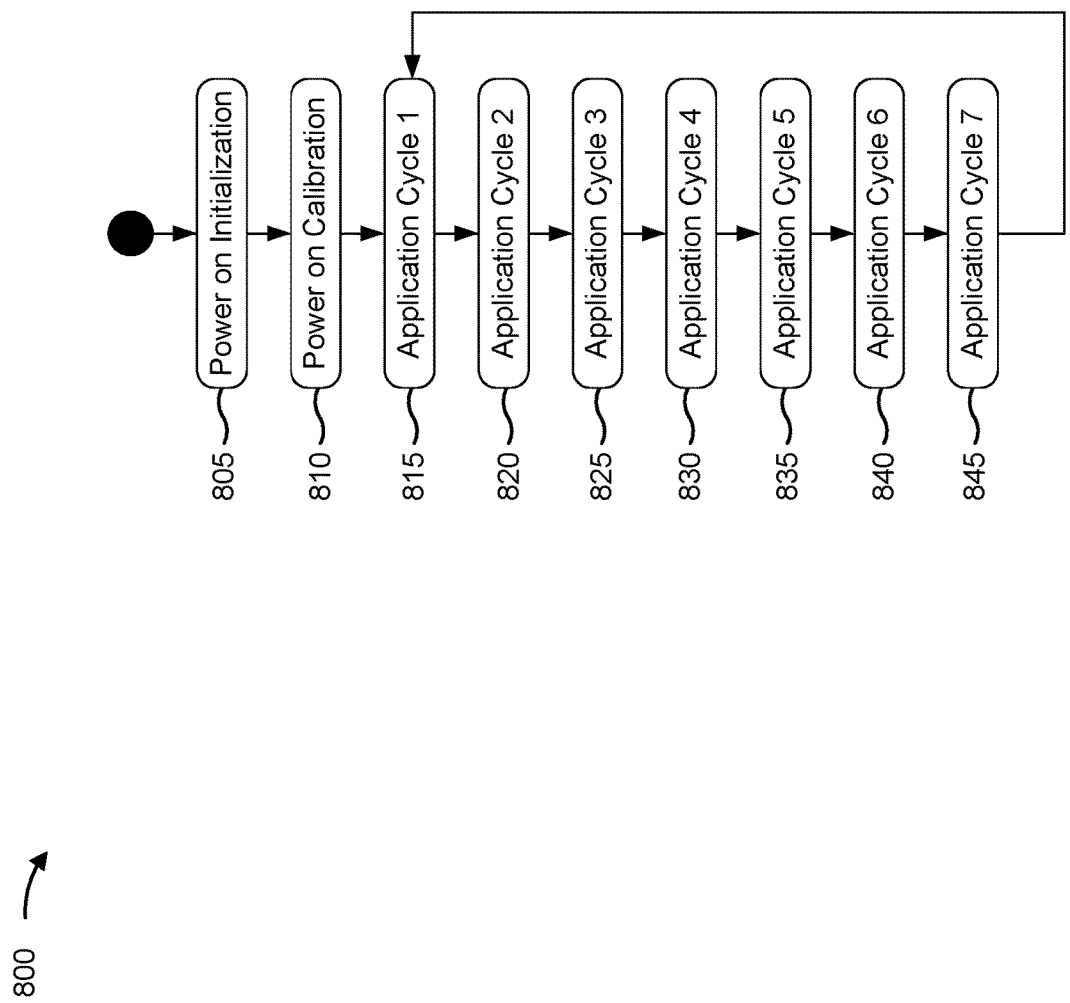
FIG. 8 illustrates a flowchart of an example process associated with context-based programming according to one or more implementations.

FIG. 8 illustrates a flowchart of an example process 800 associated with context-based programming according to one or more implementations. In some implementations, one or more process blocks of FIG. 8 are performed by a radar MMIC (e.g., radar MMIC 106). For example, one or more process blocks of FIG. 8 may be performed by the configuration and sequencing circuit 430. In some implementations, one or more process blocks of FIG. 8 may be performed by another device or a group of devices separate from or including the radar MMIC, such as MCU 405. Additionally, or alternatively, one or more process blocks of FIG. 8 may be performed by one or more components of the radar MMIC, such as CPU 520 (or another processor), non-volatile memory 525, and/or volatile memory 530.

As shown in FIG. 8, the process 800 may include performing a power on initialization (block 805) and a power on calibration (block 810). During the power on initialization, the MCU 405 may initialize the radar MMIC 106, including configuring power, a clock, and other system functions. During the power on calibration, the MCU 405 may run a one-time calibration, called a power on calibration, of the radar MMIC 106.

Following the power on initialization and the power on calibration, the MCU 405 may use the radar MMIC 106 to perform multiple application cycles 1-7 (blocks 815-845). Each application cycle is run by executing a respective programming context (e.g., a default programming context or a downloadable programming context). For example, each application cycle may configure the radar MMIC 106 to perform a respective radar measurement by, for example, transmitting a respective radar signal, which may include a plurality of frequency ramp sequences that make up a ramp scenario. In some implementations, application cycle 1 may be a default application cycle during which the default programming context is loaded, activated, and executed. The application cycles 1-7 may use the same or different programming contexts, depending on the measurement requirements controlled by the MCU 405. In other words, all programming contexts may be the same, some programming contexts may be the same and some programming contexts may be different, or all programming contexts may be different.

When an error is encountered anywhere in the application flow, the MCU 405 may either reset the application cycle loop or reset the radar MMIC 106.

As indicated above, FIG. 8 is provided as an example. Other examples may differ from what is described with regard to FIG. 8.

Figure 9:
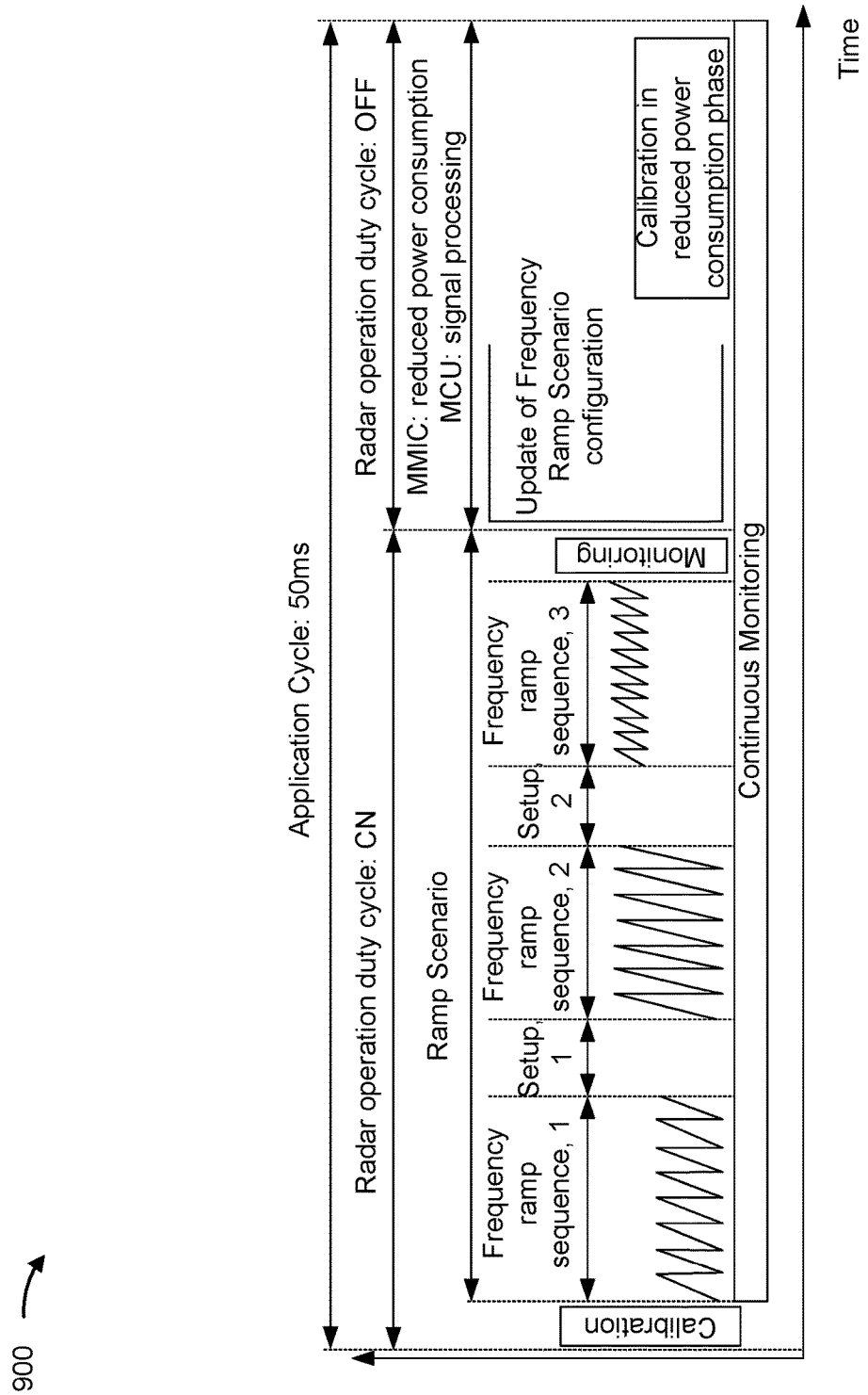
FIG. 9 illustrates an example application cycle according to one or more implementations.

FIG. 9 illustrates an example application cycle 900 according to one or more implementations. The application cycle 900 may include a radar operation duty cycle, including an ON period and an OFF period. During the ON period, the radar MMIC 106 may be configured to perform a warm-up calibration before running a ramp scenario defined by a programming context. In addition, during the ON period, the radar MMIC 106 is configured to perform a ramp scenario during which multiple frequency ramp sequences (e.g., frequency ramp sequence 1, frequency ramp sequence 2, and frequency ramp sequence 3) are transmitted according to ramp parameters defined in associated data of a programming context. In this example, the frequency ramp sequences are generated according to different sets of ramp parameters. Different programming contexts may define the same or different frequency ramp sequences. A setup operation may be performed by the radar MMIC between frequency ramp sequences, which may be used to change one or more settings or may be used to perform a calibration between the frequency ramp sequences.

In addition, during the ON period, the radar MMIC 106 is configured to perform monitoring for reflected radar signals. During the OFF period, the radar MMIC 106 may continue to monitor for reflected radar signals but is no longer transmitting radar signals. As a result, during the OFF period, the radar MMIC 106 may be configured into a reduced power consumption mode. During the OFF period, the MCU 405 may process, via signal processing, the results of the monitoring reported to the MCU 405 by the radar MMIC 106.

The application cycles may differ in the following ways: by a type of calibration and monitoring that are performed, and which ramp scenario is used. Typically, calibration and monitoring are time consuming. Therefore, the calibration and the monitoring may be split into more than one application cycle specified over multiple programming contexts. Ramp scenarios include frequency ramp sequences that further include a ramp set (e.g., shown as a triangular waveform). The ramp set may differ in terms of start frequency $f_{START}$, frequency ramp slope, stop frequency $f_{STOP}$, ramp start time $T_{START}$, time interval $T_{CHIRP}$, transmission power, and transmission phase. Additionally, if there are multiple transmit channels, a ramp set may be defined according to which transmit channel is specified for transmitting the ramp set.

As indicated above, FIG. 9 is provided as an example. Other examples may differ from what is described with regard to FIG. 9.

The following provides an overview of some Aspects of the present disclosure:

Aspect 1: A radar monolithic microwave integrated circuit (MMIC), comprising: at least one of a transmit channel for transmitting radar signals or a receive channel for receiving reflected radar signals; a communication interface configured to sequentially receive a plurality of downloadable programming contexts from an external controller, wherein each downloadable programming context comprises a respective program and associated data; a random-access memory (RAM) comprising a plurality of partitions configured to sequentially store the plurality of downloadable programming contexts that are received from the external controller, wherein each subsequent downloadable programming context received from the external controller is stored in a different partition than a partition used to store a most-recent downloadable programming context received from the external controller; and a configuration and sequencing circuit configured to: sequentially activate and deactivate the plurality of downloadable programming contexts according to a context execution sequence, and execute an activated downloadable programming context stored in a corresponding partition of the plurality of partitions, wherein the communication interface is configured to receive, and the RAM is configured to store, a subsequent downloadable programming context prior to a time slot in the context execution sequence that is assigned to the subsequent downloadable programming context.

Aspect 2: The radar MMIC of Aspect 1, wherein the configuration and sequencing circuit is configured to deactivate a previous downloadable programming context having been executed immediately prior to activating and executing a next downloadable programming context in the context execution sequence.

Aspect 3: The radar MMIC of Aspect 2, wherein the RAM is configured to overwrite the previous downloadable programming context with the subsequent downloadable programming context by storing the subsequent downloadable programming context in a same partition as the previous downloadable programming context.

Aspect 4: The radar MMIC of Aspect 2, wherein the configuration and sequencing circuit is configured to activate the next downloadable programming context and deactivate the previous downloadable programming context in response to completing an execution of the previous downloadable programming context in the context execution sequence.

Aspect 5: The radar MMIC of Aspect 2, wherein the communication interface is configured to receive, and the RAM is configured to store, the next downloadable programming context during an execution of the previous downloadable programming context.

Aspect 6: The radar MMIC of Aspect 2, wherein the configuration and sequencing circuit is configured to deactivate the previous downloadable programming context by deactivating a partition of the plurality of partitions in which the previous downloadable programming context is stored.

Aspect 7: The radar MMIC of any of Aspects 1-6, wherein the plurality of partitions consists of two partitions that are configured to store the plurality of downloadable programming contexts in an alternating sequence according to the context execution sequence.

Aspect 8: The radar MMIC of any of Aspects 1-7, wherein the configuration and sequencing circuit is configured to activate the subsequent downloadable programming context by activating a partition of the plurality of partitions in which the subsequent downloadable programming context is stored.

Aspect 9: The radar MMIC of any of Aspects 1-8, wherein: during a start-up operation or a reset of the radar MMIC, the configuration and sequencing circuit is configured to load a default programming context from an external source to a first partition of the plurality of partitions and execute the default programming context from the first partition, wherein the default programming context comprises a default program and associated default data, and wherein, during execution of the default programming context from the first partition, the communication interface is configured to receive a first downloadable programming context of the plurality of downloadable programming contexts from the external controller and the RAM is configured to store the first downloadable programming context in a second partition of the plurality of partitions.

Aspect 10: The radar MMIC of any of Aspects 1-9, further comprising: a non-volatile memory configured to store a default programming context comprising a default program and associated default data, wherein, during a start-up operation or a reset of the radar MMIC, the configuration and sequencing circuit is configured to load the default programming context from the non-volatile memory to a first partition of the plurality of partitions and execute the default programming context from the first partition, and wherein, during execution of the default programming context from the first partition, the communication interface is configured to receive a first downloadable programming context of the plurality of downloadable programming contexts from the external controller and the RAM is configured to store the first downloadable programming context in a second partition of the plurality of partitions.

Aspect 11: The radar MMIC of Aspect 10, wherein at least one downloadable programming context of the plurality of downloadable programming contexts is configured to access and execute the default program stored in the non-volatile memory.

Aspect 12: The radar MMIC of Aspect 10, wherein, in response to completing an execution of the default programming context, the configuration and sequencing circuit is configured to deactivate the default programming context stored in the first partition, activate the first downloadable programming context stored in the second partition, and execute the activated first downloadable programming context from the second partition, and wherein during execution of the first downloadable programming context from the second partition, the communication interface is configured to receive a second downloadable programming context of the plurality of downloadable programming contexts from the external controller, and the RAM is configured to store the second downloadable programming context in the first partition.

Aspect 13: The radar MMIC of Aspect 12, wherein, in response to completing an execution of the first downloadable programming context, the configuration and sequencing circuit is configured to deactivate the first downloadable programming context stored in the second partition, activate the second downloadable programming context stored in the first partition, and execute the activated second downloadable programming context from the first partition, and wherein during execution of the second downloadable programming context from the first partition, the communication interface is configured to receive a third downloadable programming context of the plurality of downloadable programming contexts from the external controller, and the RAM is configured to store the third downloadable programming context in the second partition.

Aspect 14: The radar MMIC of any of Aspects 1-13, wherein one or more downloadable programming context of the plurality of downloadable programming contexts defines at least one corresponding frequency ramp sequence of a corresponding ramp signal, and wherein the transmit channel is configured to generate the corresponding ramp signal that corresponds to the activated downloadable programming context as a radar signal.

Aspect 15: The radar MMIC of any of Aspects 1-14, wherein a first downloadable programming context defines a first ramp function for generating first ramp segments of a first ramp signal to be generated by the transmit channel based on the first downloadable programming context being executed by the configuration and sequencing circuit, wherein a second downloadable programming context defines a second ramp function for generating second ramp segments of a second ramp signal to be generated by the transmit channel based on the second downloadable programming context being executed by the configuration and sequencing circuit, wherein first ramp signal is defined by a first set of parameters provided in the associated data of the first downloadable programming context, wherein the second ramp signal is defined by a second set of parameters provided in the associated data of the second downloadable programming context, and wherein the first set of parameters are different from the second set of parameters.

Aspect 16: The radar MMIC of any of Aspects 1-15, wherein each downloadable programming context of the plurality of downloadable programming contexts includes a set of time-dependent functions, wherein the time-dependent functions include at least one of: a transmit calibration function for calibrating the transmit channel, a receive calibration function for calibrating the receive channel, a transmit monitoring function for monitoring the transmit channel, a receive monitoring function for monitoring the receive channel, a ramp function for generating ramp segments of a ramp signal, an event monitoring function for monitoring for a trigger event, a read function to read data from a read memory location of the radar MMIC, or a write function to write data to a write memory location of the radar MMIC.

Aspect 17: The radar MMIC of any of Aspects 1-16, wherein the configuration and sequencing circuit is configured to transmit an execution result of the activated downloadable programming context to the external controller in response to completing the execution of the activated downloadable programming context.

Aspect 18: The radar MMIC of any of Aspects 1-17, wherein the communication interface is configured to sequentially receive a plurality of downloadable programming contexts from the external controller according to the context execution sequence.

Aspect 19: The radar MMIC of any of Aspects 1-18, wherein the communication interface is configured to receive, and the RAM is configured to store, the subsequent downloadable programming context during an execution of the activated downloadable programming context.

Aspect 20: The radar MMIC of any of Aspects 1-19, wherein the activated downloadable programming context is the most-recent downloadable programming context received from the external controller.

Aspect 21: A method of configuring a radar monolithic microwave integrated circuit (MMIC) and executing commands of an activated downloadable programming context, the method comprising: receiving and storing a plurality of downloadable programming contexts that are sequentially received from an external controller, wherein each downloadable programming context comprises a respective program and associated data, wherein each subsequent downloadable programming context received from the external controller is stored in a different random-access memory (RAM) partition of the radar MMIC than a RAM partition of the radar MMIC used to store a most-recent downloadable programming context received from the external controller; sequentially activating and deactivating the plurality of downloadable programming contexts according to a context execution sequence; executing the commands of an activated downloadable programming context stored in a corresponding RAM partition; and downloading a next downloadable programming context prior to a time slot in the context execution sequence that is assigned to the next downloadable programming context.

Aspect 22: The method of Aspect 21, further comprising: prior to executing the commands of the activated downloadable programming context, deactivating a previous downloadable programming context having been executed immediately prior to activating and executing the activated downloadable programming context in the context execution sequence.

Aspect 23: The method of any of Aspects 21-22, further comprising: during a start-up operation or a reset of the radar MMIC, loading a default programming context from a non-volatile memory of the radar MMIC to a first RAM partition of the radar MMIC, and executing the default programming context from the first RAM partition; and during execution of the default programming context from the first RAM partition, receiving a first downloadable programming context of the plurality of downloadable programming contexts from the external controller and storing the first downloadable programming context in a second RAM partition of the radar MMIC.

Aspect 24: A system configured to perform one or more operations recited in one or more of Aspects 1-23.

Aspect 25: An apparatus comprising means for performing one or more operations recited in one or more of Aspects 1-23.

Aspect 26: A non-transitory computer-readable medium storing a set of instructions, the set of instructions comprising one or more instructions that, when executed by a device, cause the device to perform one or more operations recited in one or more of Aspects 1-23.

Aspect 27: A computer program product comprising instructions or code for executing one or more operations recited in one or more of Aspects 1-23.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software. It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Any of the processing components may be implemented as a central processing unit (CPU) or other processor reading and executing a software program from a non-transitory computer-readable recording medium such as a hard disk or a semiconductor memory device. For example, instructions may be executed by one or more processors, such as one or more CPUs, DSPs, general-purpose microprocessors, application-specific integrated circuits (ASICs), field programmable gate arrays (FPGAs), programmable logic controller (PLC), or other equivalent integrated or discrete logic circuitry. Accordingly, the term "processor," as used herein refers to any of the foregoing structures or any other structure suitable for implementation of the techniques described herein. Software may be stored on a non-transitory computer-readable medium such that the non-transitory computer readable medium includes a program code or a program algorithm stored thereon which, when executed, causes the processor, via a computer program, to perform the steps of a method.

A controller including hardware may also perform one or more of the techniques of this disclosure. A controller, including one or more processors, may use electrical signals and digital algorithms to perform its receptive, analytic, and control functions, which may further include corrective functions. Such hardware, software, and firmware may be implemented within the same device or within separate devices to support the various techniques described in this disclosure.

A signal processing circuit and/or a signal conditioning circuit may receive one or more signals (e.g., measurement signals) from one or more components in the form of raw measurement data and may derive, from the measurement signal further information. Signal conditioning, as used herein, refers to manipulating an analog signal in such a way that the signal meets the requirements of a next stage for further processing. Signal conditioning may include converting from analog to digital (e.g., via an analog-to-digital converter), amplification, filtering, converting, biasing, range matching, isolation and any other processes required to make a signal suitable for processing after conditioning.

Some implementations may be described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Even though particular combinations of features are recited in the claims and/or disclosed in the specification, these combinations are not intended to limit the disclosure of implementations described herein. Many of these features may be combined in ways not specifically recited in the claims and/or disclosed in the specification. For example, the disclosure includes each dependent claim in a claim set in combination with every other individual claim in that claim set and every combination of multiple claims in that claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

Further, it is to be understood that the disclosure of multiple acts or functions disclosed in the specification or in the claims may not be construed as to be within the specific order. Therefore, the disclosure of multiple acts or functions will not limit these to a particular order unless such acts or functions are not interchangeable for technical reasons. Furthermore, in some implementations, a single act may include or may be broken into multiple sub acts. Such sub acts may be included and part of the disclosure of this single act unless explicitly excluded.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Where only one item is intended, the phrase "only one," "single," or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. As used herein, the term "multiple" can be replaced with "a plurality of" and vice versa. Also, as used herein, the term "or" is intended to be inclusive when used in a series and may be used interchangeably with "and/or," unless explicitly stated otherwise (e.g., if used in combination with "either" or "only one of").

What is claimed is:

1. A radar monolithic microwave integrated circuit (MMIC), comprising:
   at least one of a transmit channel for transmitting radar signals or a receive channel for receiving reflected radar signals;
   a communication interface configured to sequentially receive a plurality of downloadable programming contexts from an external controller, wherein each downloadable programming context comprises a respective program and associated data;
   a random-access memory (RAM) comprising a plurality of partitions configured to sequentially store the plurality of downloadable programming contexts that are received from the external controller, wherein each subsequent downloadable programming context received from the external controller is stored in a different partition than a partition used to store a most-recent downloadable programming context received from the external controller; and
   a configuration and sequencing circuit configured to:
      sequentially activate and deactivate the plurality of downloadable programming contexts according to a context execution sequence, and
      execute an activated downloadable programming context stored in a corresponding partition of the plurality of partitions,
   wherein the communication interface is configured to receive, and the RAM is configured to store, a subsequent downloadable programming context prior to a time slot in the context execution sequence that is assigned to the subsequent downloadable programming context.

2. The radar MMIC of claim 1, wherein the configuration and sequencing circuit is configured to deactivate a previous downloadable programming context having been executed prior to activating and executing a next downloadable programming context in the context execution sequence.

3. The radar MMIC of claim 2, wherein the RAM is configured to overwrite the previous downloadable programming context with the subsequent downloadable programming context by storing the subsequent downloadable programming context in a same partition as the previous downloadable programming context.

4. The radar MMIC of claim 2, wherein the configuration and sequencing circuit is configured to activate the next downloadable programming context and deactivate the previous downloadable programming context in response to completing an execution of the previous downloadable programming context in the context execution sequence.

5. The radar MMIC of claim 2, wherein the communication interface is configured to receive, and the RAM is configured to store, the next downloadable programming context during an execution of the previous downloadable programming context.

6. The radar MMIC of claim 2, wherein the configuration and sequencing circuit is configured to deactivate the previous downloadable programming context by deactivating a partition of the plurality of partitions in which the previous downloadable programming context is stored.

7. The radar MMIC of claim 1, wherein the plurality of partitions consists of two partitions that are configured to store the plurality of downloadable programming contexts in an alternating sequence according to the context execution sequence.

8. The radar MMIC of claim 1, wherein the configuration and sequencing circuit is configured to activate the subsequent downloadable programming context by activating a partition of the plurality of partitions in which the subsequent downloadable programming context is stored.

9. The radar MMIC of claim 1, wherein:
   during a start-up operation or a reset of the radar MMIC, the configuration and sequencing circuit is configured to load a default programming context from an external source to a first partition of the plurality of partitions and execute the default programming context from the first partition, wherein the default programming context comprises a default program and associated default data, and
   wherein, during execution of the default programming context from the first partition, the communication interface is configured to receive a first downloadable programming context of the plurality of downloadable programming contexts from the external controller and the RAM is configured to store the first downloadable programming context in a second partition of the plurality of partitions.

10. The radar MMIC of claim 1, further comprising:
   a non-volatile memory configured to store a default programming context comprising a default program and associated default data,
   wherein, during a start-up operation or a reset of the radar MMIC, the configuration and sequencing circuit is configured to load the default programming context from the non-volatile memory to a first partition of the plurality of partitions and execute the default programming context from the first partition, and
   wherein, during execution of the default programming context from the first partition, the communication interface is configured to receive a first downloadable programming context of the plurality of downloadable programming contexts from the external controller and the RAM is configured to store the first downloadable programming context in a second partition of the plurality of partitions.

11. The radar MMIC of claim 10, wherein at least one downloadable programming context of the plurality of downloadable programming contexts is configured to access and execute the default program stored in the non-volatile memory.

12. The radar MMIC of claim 10, wherein, in response to completing an execution of the default programming context, the configuration and sequencing circuit is configured to deactivate the default programming context stored in the first partition, activate the first downloadable programming context stored in the second partition, and execute the activated first downloadable programming context from the second partition, and wherein during execution of the first downloadable programming context from the second partition, the communication interface is configured to receive a second downloadable programming context of the plurality of downloadable programming contexts from the external controller, and the RAM is configured to store the second downloadable programming context in the first partition.

13. The radar MMIC of claim 12, wherein, in response to completing an execution of the first downloadable programming context, the configuration and sequencing circuit is configured to deactivate the first downloadable programming context stored in the second partition, activate the second downloadable programming context stored in the first partition, and execute the activated second downloadable programming context from the first partition, and wherein during execution of the second downloadable programming context from the first partition, the communication interface is configured to receive a third downloadable programming context of the plurality of downloadable programming contexts from the external controller, and the RAM is configured to store the third downloadable programming context in the second partition.

14. The radar MMIC of claim 1, wherein one or more downloadable programming context of the plurality of downloadable programming contexts defines at least one corresponding frequency ramp sequence of a corresponding ramp signal, wherein the radar MMIC comprises the transmit channel, and wherein the transmit channel is configured to generate the corresponding ramp signal that corresponds to the activated downloadable programming context as a radar signal.

15. The radar MMIC of claim 14, wherein a first downloadable programming context defines a first ramp function for generating first ramp segments of a first ramp signal to be generated by the transmit channel based on the first downloadable programming context being executed by the configuration and sequencing circuit, wherein a second downloadable programming context defines a second ramp function for generating second ramp segments of a second ramp signal to be generated by the transmit channel based on the second downloadable programming context being executed by the configuration and sequencing circuit, wherein the first ramp signal is defined by a first set of parameters provided in the associated data of the first downloadable programming context, wherein the second ramp signal is defined by a second set of parameters provided in the associated data of the second downloadable programming context, and wherein the first set of parameters are different from the second set of parameters.

16. The radar MMIC of claim 1, wherein each downloadable programming context of the plurality of downloadable programming contexts includes a set of time-dependent functions, wherein the time-dependent functions include at least one of:
a transmit calibration function for calibrating the transmit channel, a receive calibration function for calibrating the receive channel, a transmit monitoring function for monitoring the transmit channel, a receive monitoring function for monitoring the receive channel, a ramp function for generating ramp segments of a ramp signal, an event monitoring function for monitoring for a trigger event, a read function to read data from a read memory location of the radar MMIC, or a write function to write data to a write memory location of the radar MMIC.

17. The radar MMIC of claim 1, wherein the configuration and sequencing circuit is configured to transmit an execution result of the activated downloadable programming context to the external controller in response to completing an execution of the activated downloadable programming context.

18. The radar MMIC of claim 1, wherein the communication interface is configured to sequentially receive a plurality of downloadable programming contexts from the external controller according to the context execution sequence.

19. The radar MMIC of claim 1, wherein the communication interface is configured to receive, and the RAM is configured to store, the subsequent downloadable programming context during an execution of the activated downloadable programming context.

20. The radar MMIC of claim 1, wherein the activated downloadable programming context is the most-recent downloadable programming context received from the external controller.

21. A method of configuring a radar monolithic microwave integrated circuit (MMIC) and executing commands of an activated downloadable programming context, the method comprising:

receiving and storing a plurality of downloadable programming contexts that are sequentially received from an external controller, wherein each downloadable programming context comprises a respective program and associated data, wherein each subsequent downloadable programming context received from the external controller is stored in a different random-access memory (RAM) partition of the radar MMIC than a RAM partition of the radar MMIC used to store a most-recent downloadable programming context received from the external controller;

sequentially activating and deactivating the plurality of downloadable programming contexts according to a context execution sequence;

executing the commands of an activated downloadable programming context stored in a corresponding RAM partition; and downloading a next downloadable programming context prior to a time slot in the context execution sequence that is assigned to the next downloadable programming context.

22. The method of claim 21, further comprising:
prior to executing the commands of the activated downloadable programming context, deactivating a previous downloadable programming context having been executed immediately prior to activating and executing the activated downloadable programming context in the context execution sequence.

23. The method of claim 21, further comprising:
- during a start-up operation or a reset of the radar MMIC, loading a default programming context from a nonvolatile memory of the radar MMIC to a first RAM partition of the radar MMIC, and executing the default programming context from the first RAM partition; and
- during execution of the default programming context from the first RAM partition, receiving a first downloadable programming context of the plurality of downloadable programming contexts from the external controller and storing the first downloadable programming context in a second RAM partition of the radar MMIC.

\* \* \* \* \*